(12) United States Patent
Hayakawa et al.

(10) Patent No.: US 10,289,881 B2
(45) Date of Patent: May 14, 2019

(54) WIRELESS COMMUNICATION SYSTEM, ELECTRONIC APPARATUS, READER/WRITER

(71) Applicant: OMRON Corporation, Kyoto (JP)

(72) Inventors: Masayuki Hayakawa, Kizugawa (JP); Seiji Tanaka, Okayama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/750,827

(22) PCT Filed: Feb. 9, 2017

(86) PCT No.: PCT/JP2017/004791
§ 371 (c)(1),
(2) Date: Feb. 6, 2018

(87) PCT Pub. No.: WO2017/159143
PCT Pub. Date: Sep. 21, 2017

(65) Prior Publication Data
US 2018/0232547 A1 Aug. 16, 2018

(30) Foreign Application Priority Data

Mar. 15, 2016 (JP) .................................. 2016-051574

(51) Int. Cl.
*G06K 19/00* (2006.01)
*G06K 7/10* (2006.01)
*H04B 1/59* (2006.01)
(52) U.S. Cl.
CPC ........... *G06K 7/10366* (2013.01); *H04B 1/59* (2013.01)

(58) Field of Classification Search
USPC .......................... 235/435, 439, 451, 487, 492
See application file for complete search history.

(56) References Cited

U.S. PATENT DOCUMENTS

2012/0164944 A1* 6/2012 Yamaoka ........... G06K 7/10198
455/41.1

FOREIGN PATENT DOCUMENTS

| JP | 2006-005633 | 1/2006 |
|---|---|---|
| JP | 2010-061262 | 3/2010 |
| JP | 2012100307 | 5/2012 |
| JP | 2013-052556 | 3/2013 |
| JP | 2014112819 | 6/2014 |

(Continued)

OTHER PUBLICATIONS

"Office Action of Japan Counterpart Application," with machine English translation thereof, dated Jul. 31, 2018, p. 1-p. 6.

(Continued)

Primary Examiner — Matthew Mikels
(74) Attorney, Agent, or Firm — JCIPRNET

(57) ABSTRACT

The present invention addresses the problem of preventing the malfunction of an electronic apparatus containing an RFID module with a wired communication port. A reader/writer compares the model of setting information that was inputted by a user and is to be written, with the model of a temperature controller wirelessly transmitted from an RFID module of the temperature controller, and if the models match one another, the setting information corresponding to the model of the temperature controller is wirelessly written to the memory of the RFID module.

20 Claims, 22 Drawing Sheets

(56) References Cited

FOREIGN PATENT DOCUMENTS

| JP | 2015099565 | 5/2015 |
| WO | 2012004939 | 1/2012 |

OTHER PUBLICATIONS

"International Search Report (Form PCT/ISA/210) of PCT/JP2017/004791," dated May 16, 2017, with English translation thereof, pp. 1-2.

"Written Opinion of the International Searching Authority (Form PCT/ISA/237) of PCT/JP2017/004791," dated May 16, 2017, with English translation thereof, pp. 1-10.

* cited by examiner (a)

(b)

Table For Company X Factory Y

|  | A Line | B Line | C Line |
|---|---|---|---|
| Model: TA20 | Setting File OMRTA20-XYA2 | Setting File OMRTA20-XYB1 | — |
| Model: TA120 | — | — | Setting File OMRTA120-XYC1 |
| Model: TA220 | — | — | — |

Table For Company X Factory W

|  | D Line | E Line | F Line |
|---|---|---|---|
| Model: TA20 | — | — | Setting File OMRTA20-XWF1 |
| Model: TA120 | — | Setting File OMRTA120-XWE1 | — |
| Model: TA220 | Setting File OMRTA220-XWD1 | — | — |

(a)

Device Setting (Customer Selection)
⇒ ● Company X
● Company Z

⇒ Touch

⇓

Device Setting (Line Selection)

Company X Factory Y
⇒ ● For A Line
● For B Line
● For C Line

Company X Factory W
● For D Line
● For E Line
● For F Line (b)

Table For Company X Factory Y

|  | A Line | B Line | C Line |
|---|---|---|---|
| Model : TA20 | Setting File OMRTA20-XYA1 | Setting File OMRTA20-XYB1 | — |
| Model : TA120 | — | — | Setting File OMRTA120-XYC1 |
| Model : TA220 | — | — | — |

Table For Company X Factory W

|  | D Line | E Line | F Line |
|---|---|---|---|
| Model : TA20 | — | — | Setting File OMRTA20-XWF1 |
| Model : TA120 | — | Setting File OMRTA120-XWE1 | — |
| Model : TA220 | Setting File OMRTA220-XWD1 | — | — |

FIG. 14

WIRELESS COMMUNICATION SYSTEM, ELECTRONIC APPARATUS, READER/WRITER

CROSS-REFERENCE TO RELATED APPLICATION

This application is a 371 application of the International PCT application serial no. PCT/JP2017/004791, filed on Feb. 9, 2017, which claims the priority benefit of Japanese application serial no. 2016-051574, filed on Mar. 15, 2016. The entirety of each of the above-mentioned patent applications is hereby incorporated by reference herein and made a part of this specification.

BACKGROUND

Technical Field

The present invention relates to a wireless communication system, an electronic apparatus, and a reader/writer.

Description of Related Art

Patent Literature 1 discloses a configuration in which an RFID module including a wired communication port is disposed inside an electronic apparatus, and the wired communication port of the RFID module is connected to a control circuit of the electronic apparatus. According to such a configuration, by storing setting values of the electronic apparatus in a storage circuit of the RFID module, the setting values can be used for controlling the electronic apparatus.

CITATION LIST

Patent Literature

[Patent Literature 1]
Japanese Unexamined Patent Application Publication No. 2006-5633 (published on Jan. 5, 2006)
[Patent Literature 2]
Japanese Unexamined Patent Application Publication No. 2010-061262 (published on Mar. 18, 2010)

SUMMARY

Technical Problem

In the configuration described above, an electronic apparatus includes a wireless communication module with a wired communication port attached, while there is convenience of easily wirelessly writing setting values of the electronic apparatus into the wireless communication module, a countemeasure for preventing a malfunction of the apparatus due to inappropriate setting values is requested.

One object of the present invention is to prevent a malfunction of an electronic apparatus including a wireless communication module with a wired port attached.

Solution to Problem

There is provided a wireless communication system including: an electronic apparatus including a wireless communication module and a processing unit connected to the wireless communication module through a wired communication port, the wireless communication module includes the wired communication port and a memory; and a reader/writer capable of wirelessly communicating with the wireless communication module, wherein a model of the electronic apparatus is stored in the memory of the wireless communication module, and the reader/writer collates a model of a write target of setting information input by a user with the model of the electronic apparatus transmitted from the wireless communication module and, in a case in which the models are consistent with each other, wirelessly writes setting information corresponding to the model into the memory of the wireless communication module. In other words, in the case of a collation defect in which the models are not consistent with each other, wireless writing of setting information using the reader/writer is not performed.

Advantageous Effects of Invention

A malfunction of an electronic apparatus including a wireless communication module with a wired communication port attached can be prevented.

BRIEF DESCRIPTION OF THE DRAWINGS

FIG. 14 is an explanatory diagram illustrating an input process of the setting operation according to Embodiment 3.

DESCRIPTION OF THE EMBODIMENTS

Embodiments of the present invention will be described with reference to FIGS. 1 to 22. While a temperature controller will be described below as one example of an electronic apparatus, the electronic apparatus may be an FA device such as a timer, a counter, a sensor, or a controller, a medical device, or the like and is not particularly limited. In addition, as an example of wireless communication, although a radio frequency identification (RFID) system will be described, a system using infrared communication or the like may be used, and the wireless communication is not particularly limited.

Embodiment 1

Figure 1:
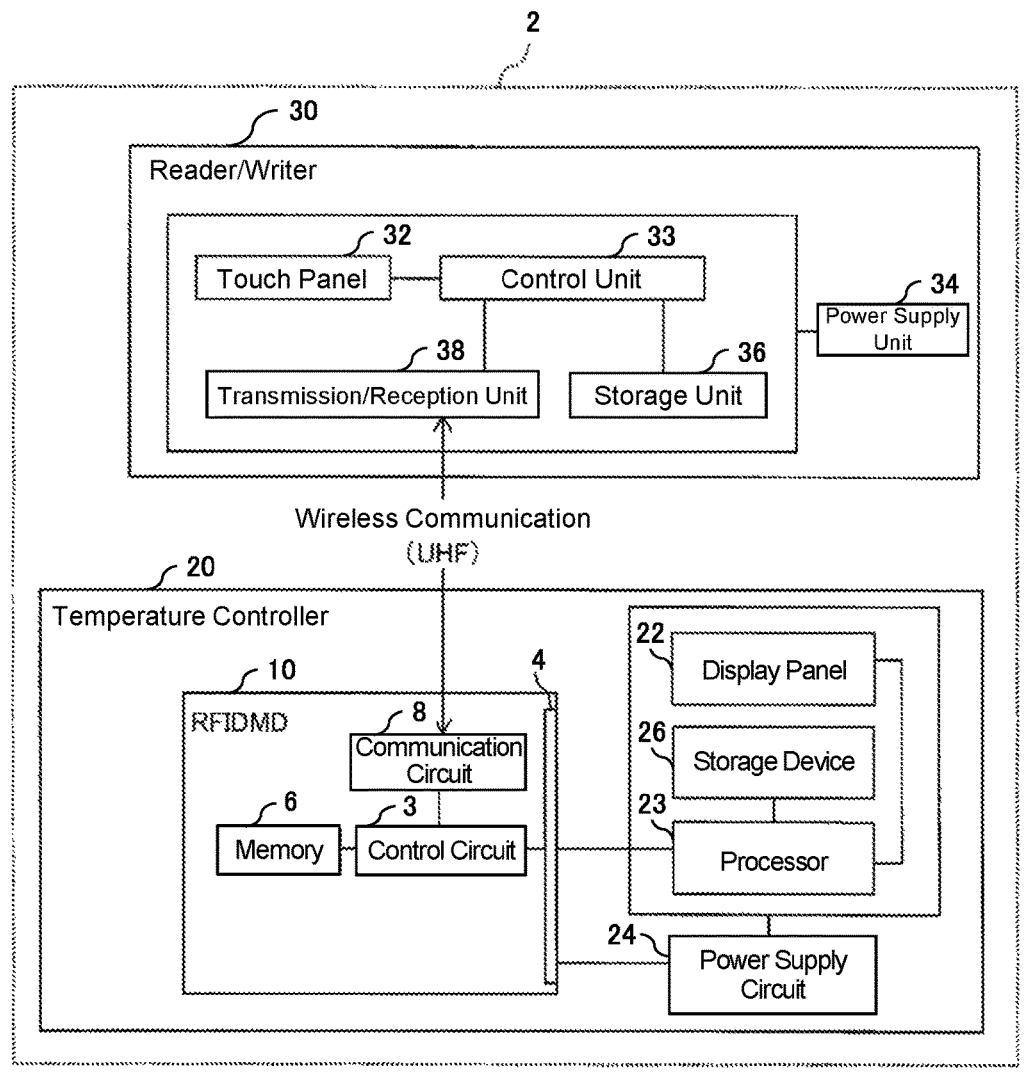
FIG. 1 is a block diagram illustrating a wireless communication system according to Embodiment 1.

As illustrated in FIG. 1, a wireless communication system 2 according to Embodiment 1 includes a temperature controller 20 having an RFID module (which may be abbreviated to RFIDMD or MD hereinafter) 10 built therein and a reader/writer 30.

The reader/writer 30 includes a touch panel 32, a transmission/reception unit 38, a storage unit 36, a control unit 33, and a power supply unit 34.

The temperature controller 20 includes: the RFID module 10 including a communication circuit 8, a memory 6 (for example, an FRAM (registered trademark)), a control circuit 3, and a wired communication port 4; a display panel 22; a storage device 26; a processor 23; and a power supply circuit 24, and executes wireless communication (for example, in a UHF band) between an antenna included in the communication circuit 8 and an antenna included in the transmission/reception unit 38 of the reader/writer 30. In other words, the reader/writer 30 can execute wireless writing for the memory 6 of the RFID module 10 and wireless reading from the memory 6.

The control circuit 3 of the RFID module 10 is connected to the processor 23 and the power supply circuit 24 through the wired communication port 4, the processor 23 can execute wired writing for the memory 6 of the RFID module 10 and wired reading from the memory 6. The power supply circuit 24 supplies electric power to the display panel 22, the processor 23, the storage device 26, and the RFID module 10. In a case in which the power supply circuit 24 is off, the RFID module 10 becomes a passive type, and electric power generated by the communication circuit 8 is used by the control circuit 3 and the memory 6 during wireless communication with the reader/writer 30.

After the model TA20 of the temperature controller 20 is wirelessly written in the memory 6 of the RFID module 10, and predetermined data (to be described later) is stored in the storage device 26, the temperature controller 20 is shipped to a user (for example, an agency).

Figure 2:
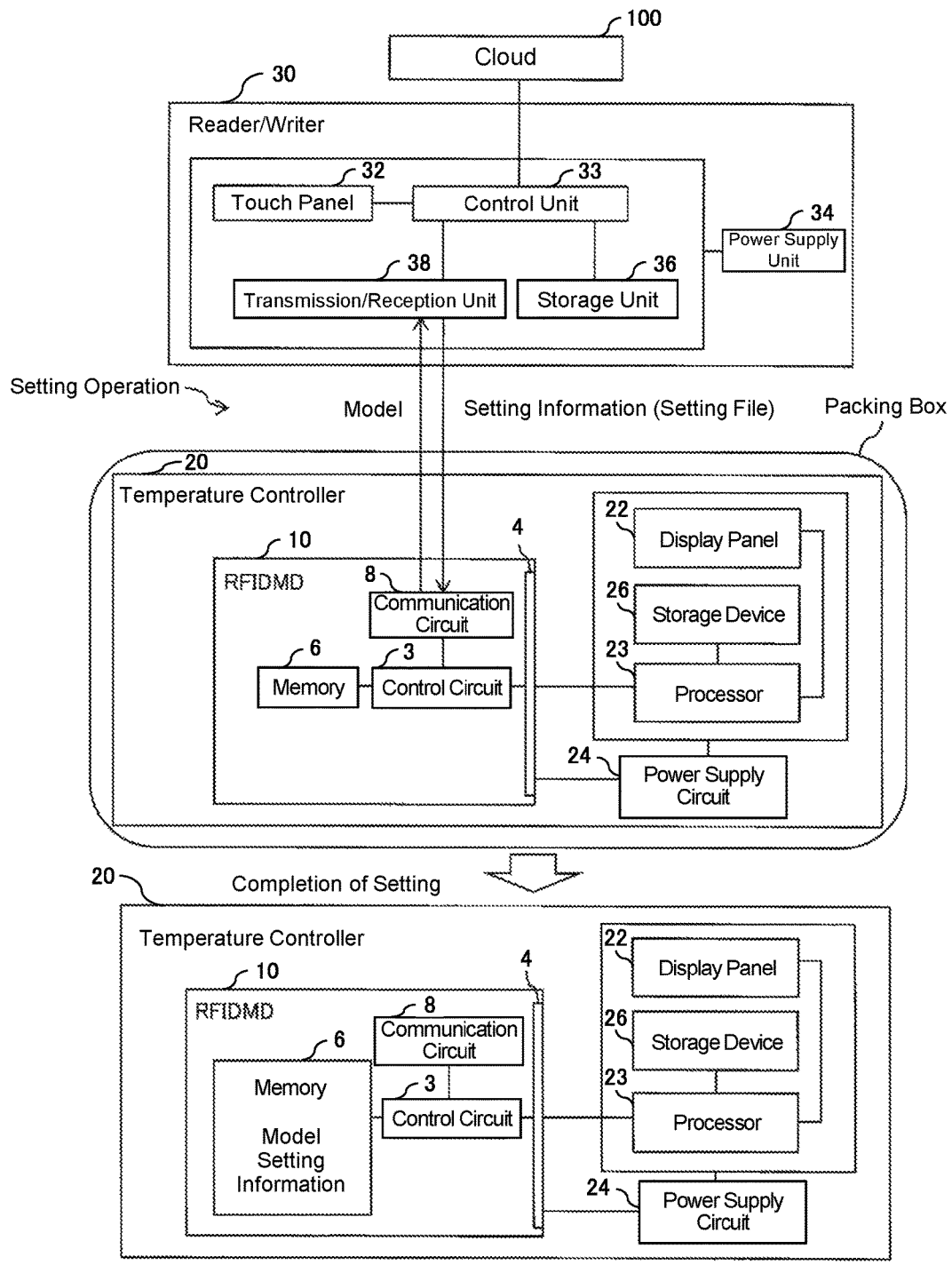
FIG. 2 is a block diagram illustrating a setting operation of the wireless communication system according to Embodiment 1.
Figure 3:
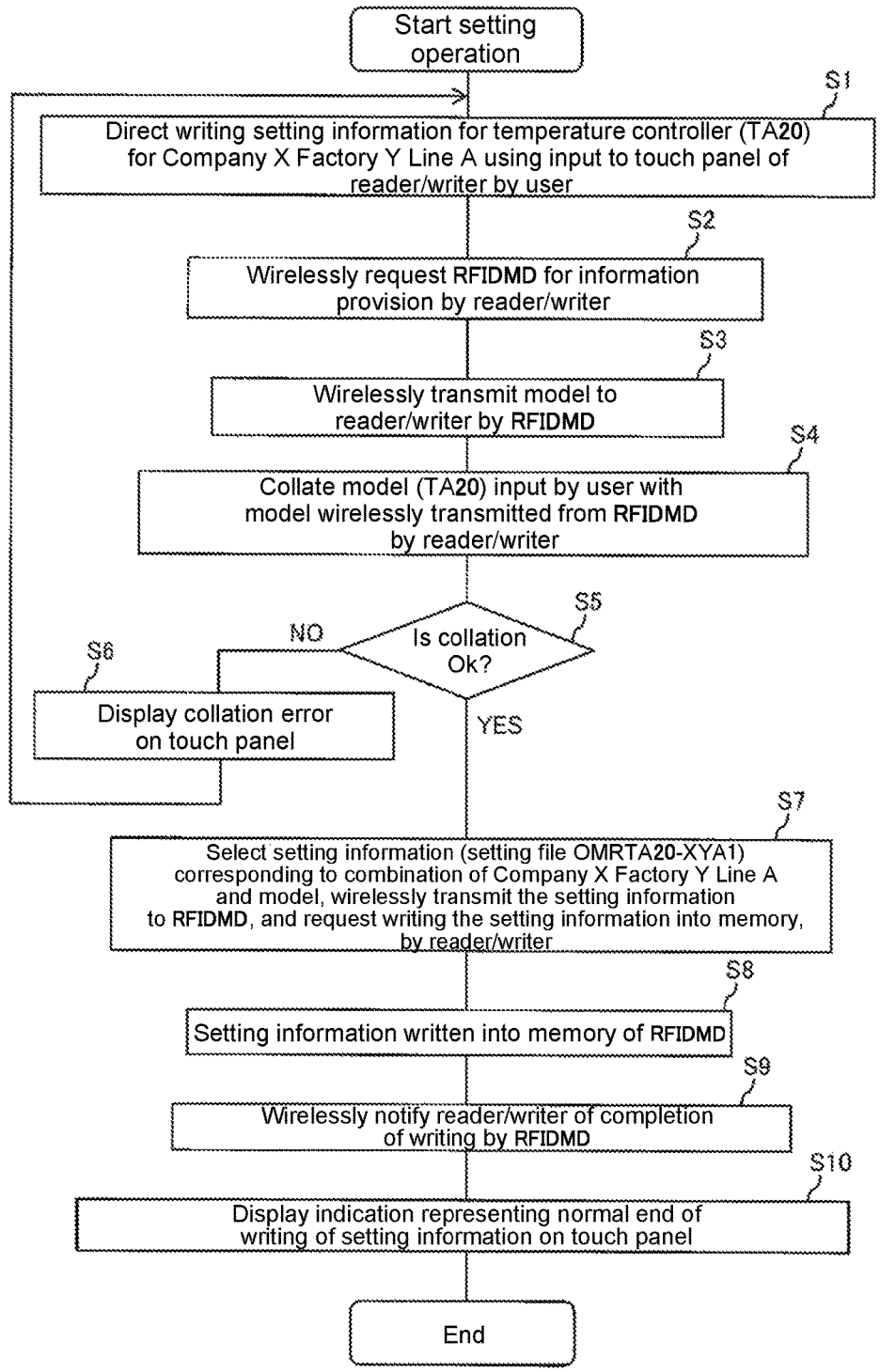
FIG. 3 is a flowchart illustrating a setting operation according to Embodiment 1.
Figure 4:
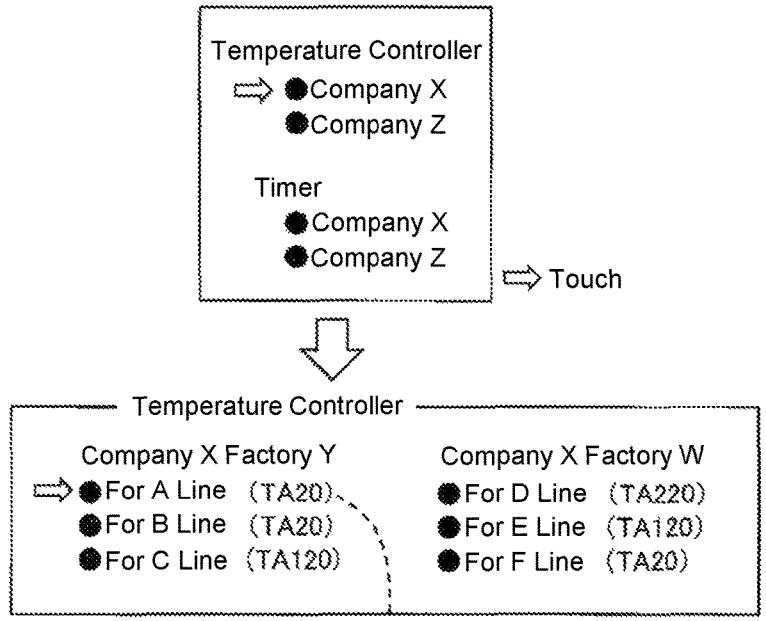
FIG. 4 is an explanatory diagram illustrating an input process of the setting operation according to Embodiment 1.

In Embodiment 1, as illustrated in FIGS. 2 to 4, a setting operation (writing setting information into the RFID module) of the temperature controller 20 is performed. This setting operation (also called a shipment operation) is generally performed in a state in which the temperature controller is housed in a packing box, for example, by an agent that is a user.

First, a user directs writing of setting information in a temperature controller (model: TA20) for company X factory Y line A by performing an input on the touch panel 32 of the reader/writer 30 (Step S1). In Step S1, as illustrated in part (a) of FIG. 4, the user selects "company X" in a temperature controller field through a touch and then selects "line A (TA20)" of a company X factory Y field through a touch.

The control unit 33 of the reader/writer 30 receives the direction from the user that is executed in Step S1 and wirelessly transmits an information provision request signal from the transmission/reception unit 38 to the RFID module 10 (built in the temperature controller 20 inside a packing box) (Step S2).

In the RFID module 10, the control circuit 3 receives an information provision request signal transmitted in Step S2 through the communication circuit 8 and wirelessly transmits the model (TA20) of the temperature controller 20, which is written in the memory 6, from the communication circuit 8 to the reader/writer 30 (Step S3).

In the reader/writer 30, the control unit 33 that has received the model (TA20) in Step S3 from the transmission/reception unit 38 collates the model (TA20) wirelessly transmitted from the RFID module 10 with a model (TA20) input by the user in cooperation with the storage unit 36 (Step S4).

In the case of "no" (two models are inconsistent) in Step S5 (is collation OK?), the control unit 33 displays a collation error on the touch panel 32 (Step S6). On the other hand, in the case of "yes" (two models are consistent) in Step S5 (is collation OK?), the control unit 33 selects setting information (setting file OMRTA20-XYA1) corresponding to a combination of the company X factory Y line A and the model (TA20) from a table as illustrated in part (b) of FIG. 4 stored in the storage unit 36, wirelessly transmits the selected setting information from the transmission/reception unit 38 to the RFID module 10, and requests the RFID module 10 to write the selected setting information into the memory 6 (Step S7).

In the setting file, various setting values such as a target value corresponding to a destination and a type of sensor to be used are included. In a name of the setting file, the model information (TA20), destination information (specification information), and version information (XYA1) of the temperature controller 20 are included. As will be described later, "OMRTA20" of a first half is identification information and functions as a password at the time of starting the operation of the temperature controller.

In the RFID module 10, the control circuit 3 receives a write request for the setting information (the setting file OMRTA20-XYA1) of Step S7 through the communication circuit 8 and writes the setting information into the memory 6 (Step S8). When the writing process is completed, the control circuit 3 wirelessly transmits a write completion signal from the communication circuit 8 to the reader/writer 30 (Step S9).

In the reader/writer 30, the control unit 33 that has received the write completion signal of Step S9 from the transmission/reception unit 38 displays an indication representing the normal end of the writing of the setting information on the touch panel 32 (Step S10). Accordingly, the user recognizes that the setting operation (shipment operation) has been appropriately performed.

Figure 5:
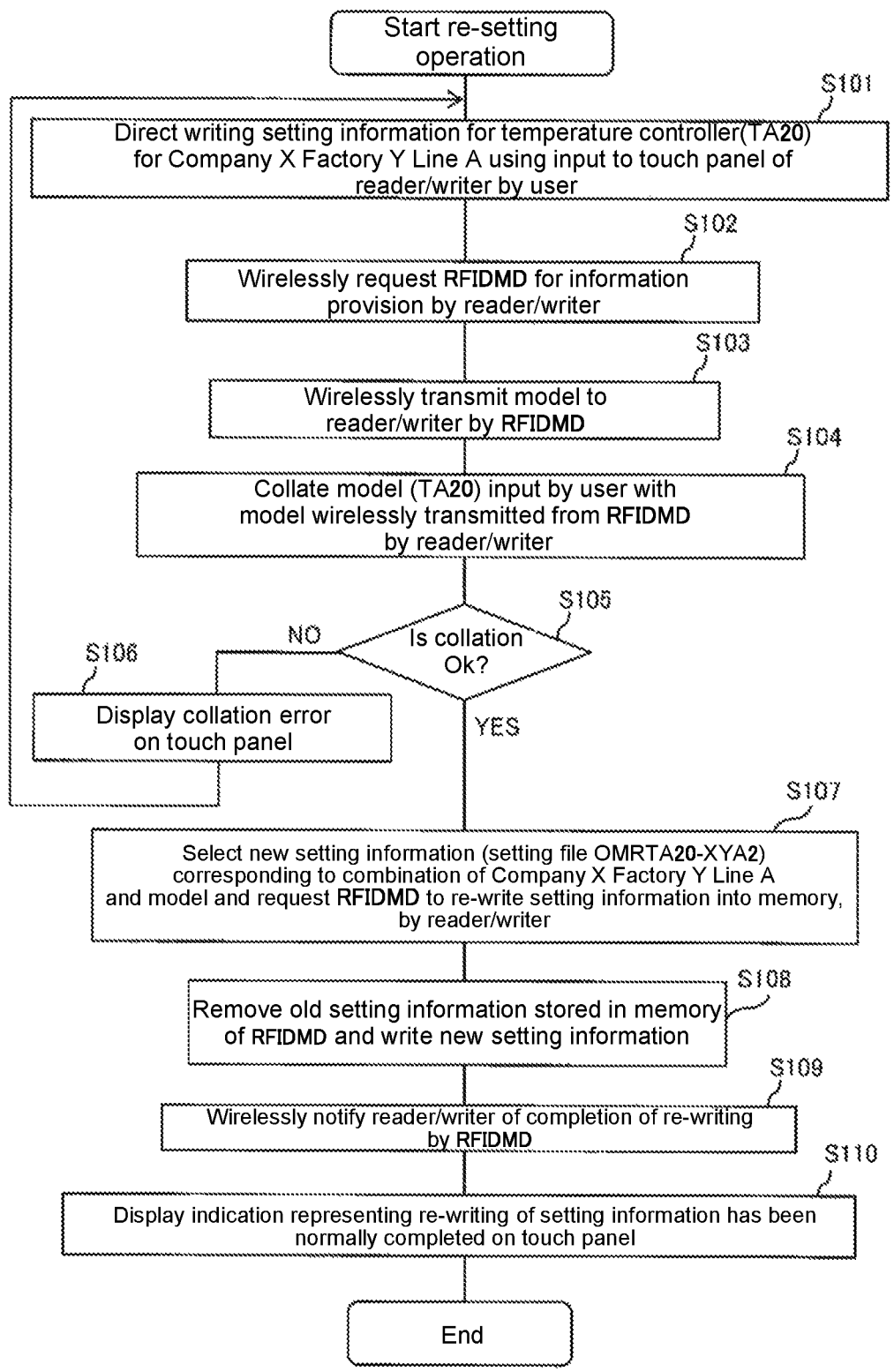
FIG. 5 is a flowchart illustrating a re-setting (setting update) operation according to Embodiment 1.
Figure 6:
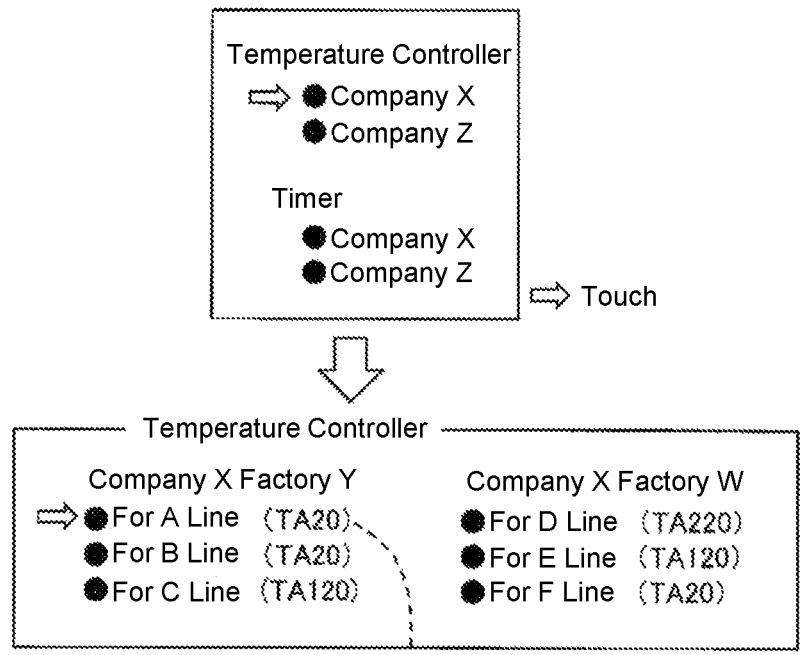
FIG. 6 is a flowchart illustrating an input process of the re-setting operation according to Embodiment 1.

In addition, in a case in which the setting information is desired to be updated after the setting operation or in a case in which there is a setting error, a re-setting operation is performed as illustrated in FIGS. 5 and 6.

In other words, in Step S101, a user directs re-writing setting information in the temperature controller (TA20) for company X factory Y line A by performing an input on the touch panel 32 of the reader/writer 30 (see part (a) of FIG. 6). In the following Step S102, the reader/writer 30 wirelessly requests the RFID module 10 for the provision of information. In the following Step S103, the RFID module 10 wirelessly transmits the model (TA20) to the reader/writer 30. In the following Step S104, the reader/writer 30 collates the model (TA20) input from the user with the model wirelessly transmitted from the RFID module 10.

In the case of "no" (two models are inconsistent) in the following Step S105 (is collation OK?), a collation error is displayed on the touch panel 32 of the reader/writer 30 (Step S106). On the other hand, in the case of "yes" (two models are consistent) in Step S105, the reader/writer 30 selects new setting information (setting file OMRTA20-XYA2) corresponding to a combination of the company X factory Y line A and the model from the table as illustrated in part (b) of FIG. 6, wirelessly transmits the selected new setting information to the RFID module 10, and requests the RFID module 10 to rewrite the selected new setting information into the memory (Step S107). In this way, in Step S108, old setting information stored in the memory 6 of the RFID module 10 is removed, and the new setting information is written (update of the setting information).

In the following Step S109, the RFID module 10 wirelessly notifies the reader/writer 30 of the completion of the rewriting, and in the following Step S110, an indication representing the normal end of the rewriting of the setting information is displayed on the touch panel 32.

Figure 7:
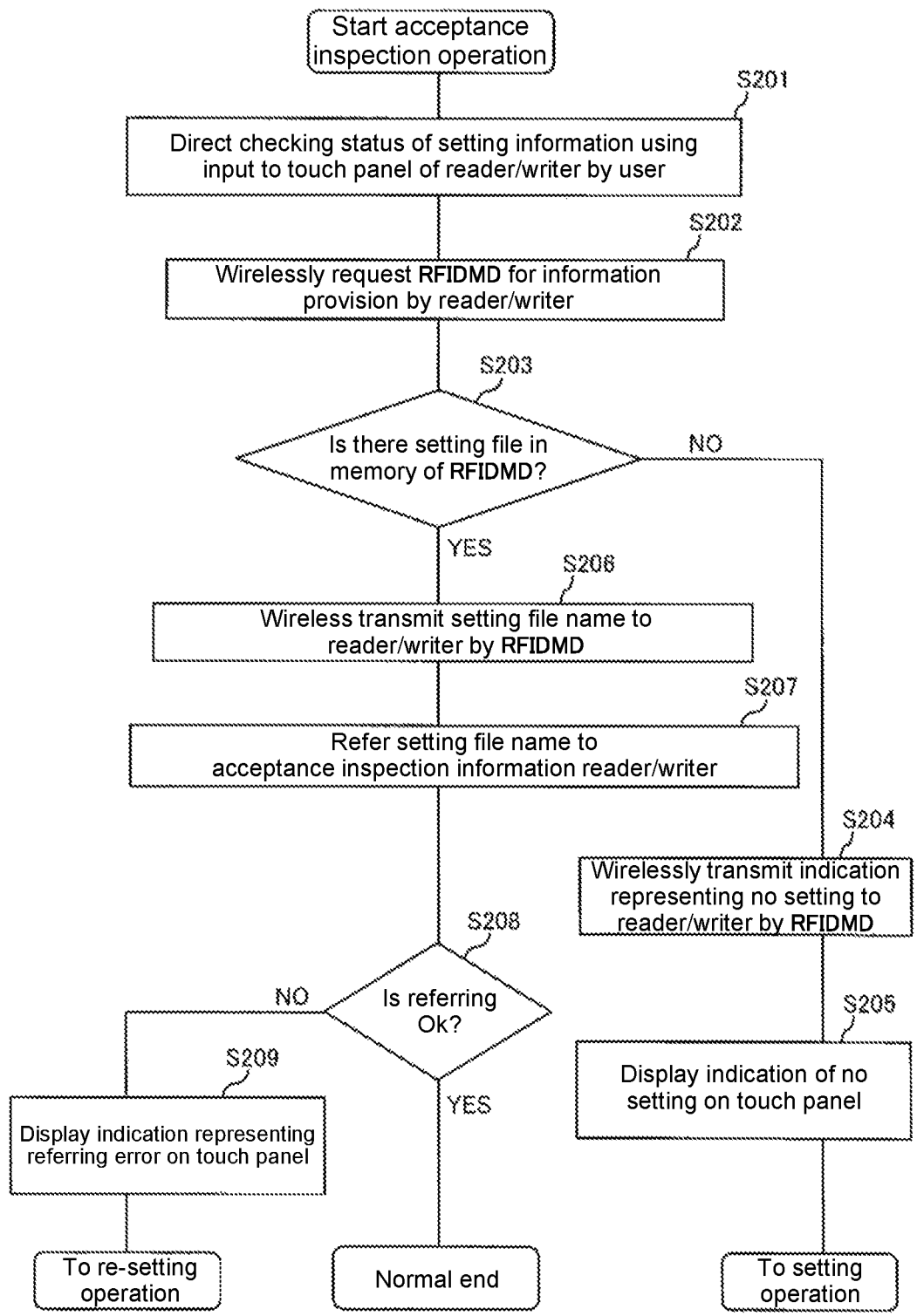
FIG. 7 is an explanatory diagram illustrating the re-setting (setting update) operation according to Embodiment 1.

In addition, in an acceptance inspection after the setting operation or the like, the status of the setting information is checked as illustrated in FIG. 7.

In other words, in Step S201, a user directs to check the status of the setting information by performing an input on the touch panel 32 of the reader/writer 30. In the following Step S202, the reader/writer 30 wirelessly requests the RFID module 10 to provide information.

In the case of "No" (there is no setting file) in the following Step S203 (is there a setting file in the RFID module 10?), the RFID module 10 wirelessly transmits an indication representing no setting (there is no setting file) to the reader/writer 30 (S204), an indication representing no setting is displayed on the touch panel 32 (S205), and the process proceeds to the setting operation (writing of setting information) illustrated in FIG. 3.

On the other hand, in the case of "yes" (there is a setting file) in Step S203, the RFID module 10 wirelessly transmits a setting file name (OMRTA20-XYA1) to the reader/writer 30 (Step S206), and the reader/writer 30 refers the setting file name to the acceptance inspection information (database) prepared in advance (Step S207). In Step S207, for example, it is determined whether or not the model "TA20" and the destination "XYA" is consistent with the acceptance inspection information, or whether or not "1" included at the end of the version information is consistent with the acceptance inspection information.

In the case of "yes" in the following Step S208 (is referring OK?), the acceptance inspection operation ends normally. On the other hand, in the case of "no" in Step S208 (is referring OK?), an indication representing a referring error is displayed on the touch panel 32 (Step S209), and the process proceeds to the re-setting operation (rewriting of setting information) illustrated in FIG. 5.

Figure 8:
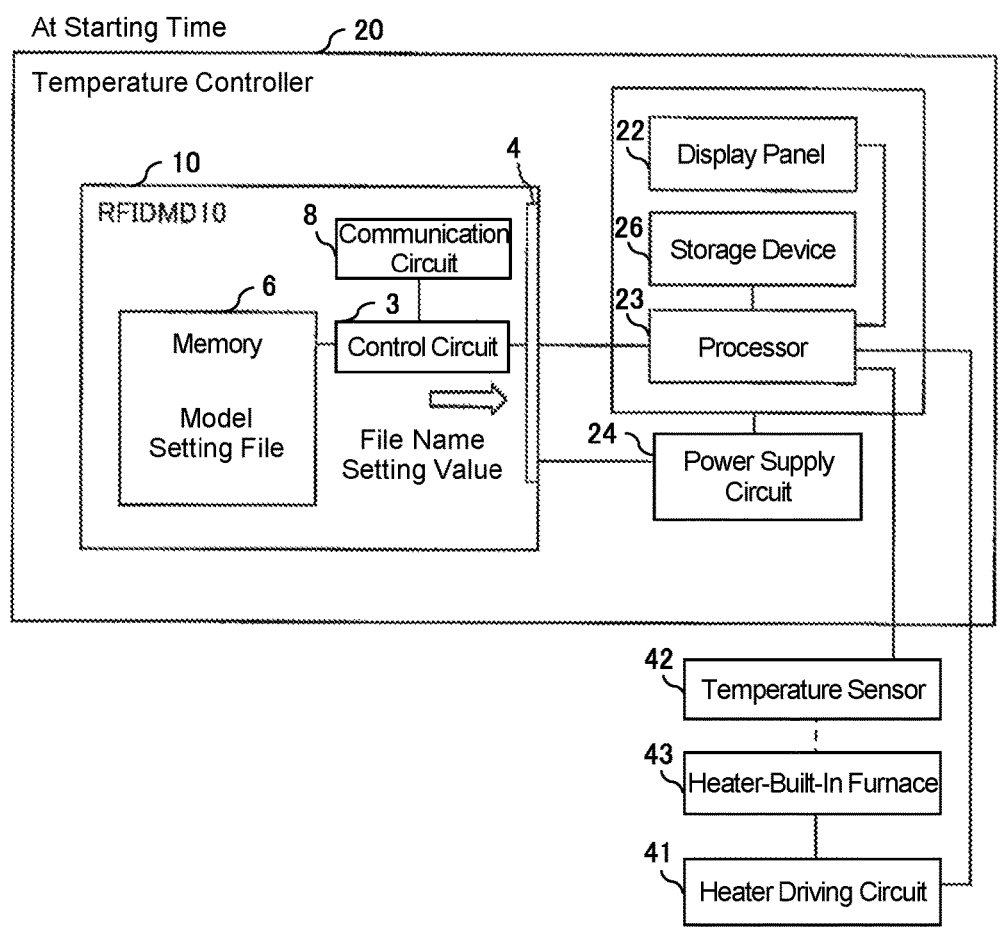
FIG. 8 is a block diagram illustrating a start-time state of a temperature controller according to Embodiment 1.
Figure 9:
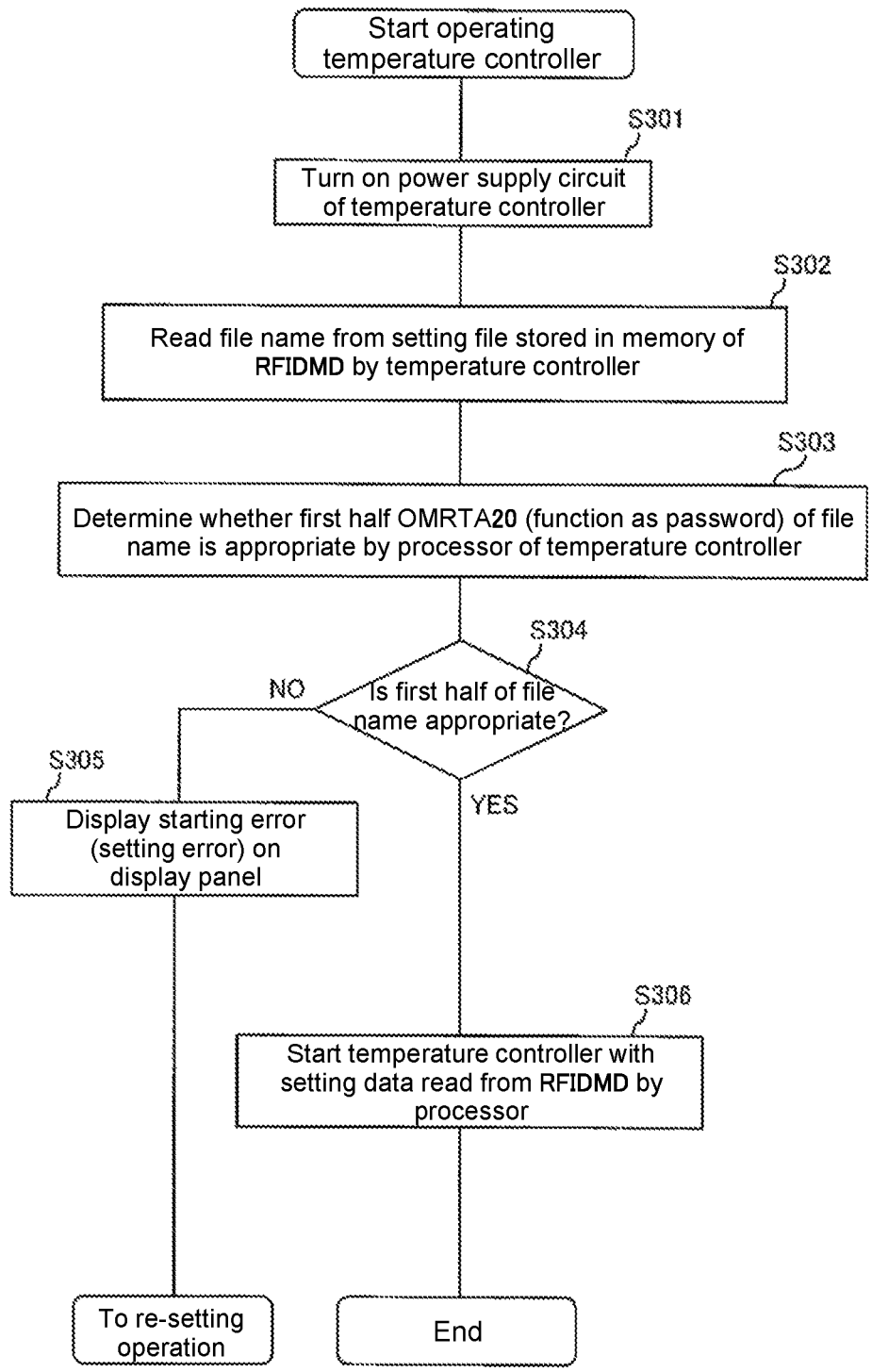
FIG. 9 is a flowchart illustrating a starting process of the temperature controller according to Embodiment 1.

Operation of the temperature controller of which the acceptance inspection operation has ended starts as illustrated in FIGS. 8 and 9. In addition, before starting the operation, a heater driving circuit 41 driving a heater-built-in furnace 43 and a temperature sensor 42 the measures the temperature of the heater-built-in furnace 43 are connected to the temperature controller 20.

When a user turns on the power supply circuit 24 of the temperature controller 20 (Step S301), the processor 23 of the temperature controller 20 reads a file name from the setting file stored in the memory 6 of the RFID module 10 (Step S302).

In Step S303, the processor 23 determines whether or not the identification information "OMRTA20" of the first half of the file name functioning as a password is appropriate. More specifically, the processor 23 refers the first half of the file name to predetermined data stored in the storage device 26 that cannot be wirelessly accessed before shipping.

In the case of "no" (the first half of the file name is inappropriate) in Step S304 (is the first half of the file name appropriate?), the processor 23 displays a start error (setting error) on the display panel 22 (Step S305). In this case, the re-setting operation (rewriting of setting information) illustrated in FIG. 5 is necessary.

In the case of "yes" (the first half of the file name is appropriate) in Step S304 (is first half of the file name appropriate?), the processor 23 executes a starting process of the temperature controller 20 by using various setting values read from the setting file of the RFID module 10 (Step S306).

Figure 10:
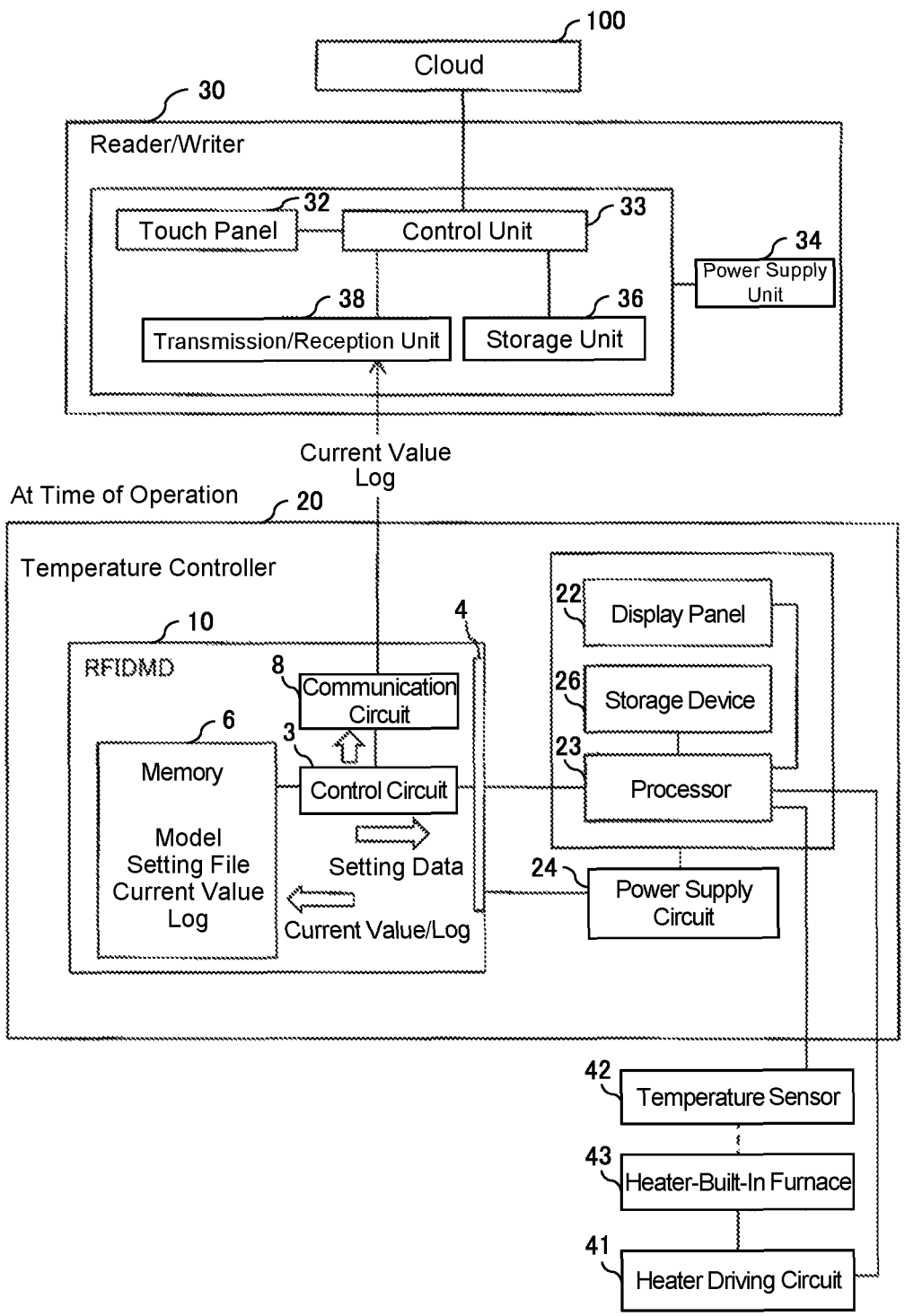
FIG. 10 is a block diagram illustrating an operation-time state of the temperature controller according to Embodiment 1.

The temperature controller 20 which has been started normally is transitioned to an operating state. When the temperature controller 20 operates, as illustrated in FIG. 10, the processor 23 controls the heater driving circuit 41 on the basis of various setting values read from the setting file of the memory 6 of the RFID module 10. In addition, the processor 23 displays a current value (temperature) on the display panel 22 or writes a current value (temperature) and a log into the memory 6 through the control circuit 3 of the RFID module 10.

Furthermore, when a request from the reader/writer 30 is received, the control circuit 3 of the RFID module 10 transmits a current value and a log stored in the memory 6 from the communication circuit 8 to the reader/writer 30. In the reader/writer 30, the control unit 33 that has received the current value and the log through the transmission/reception unit 38 transmits the current value and the log to a network such as a cloud 100 in cooperation with the storage unit 36.

Figure 11:
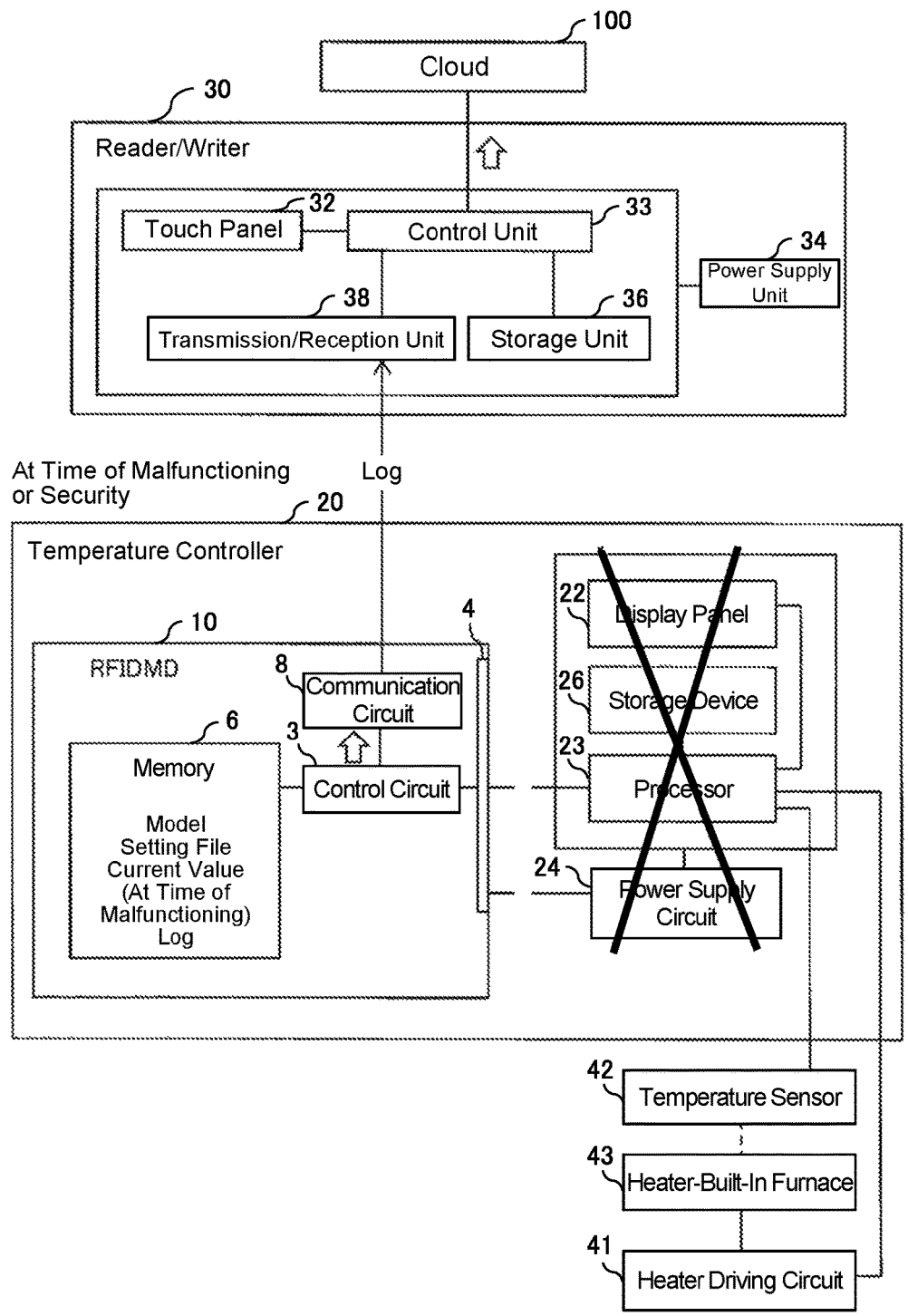
FIG. 11 is a block diagram illustrating the state of the temperature controller at a malfunction/security time according to Embodiment 1.

According to the temperature controller 20, even when the power supply circuit 24 is down (at a malfunction/security time) as illustrated in FIG. 11, the control circuit 3 can receive a request from the reader/writer 30 and transmit the log stored in the memory 6 from the communication circuit 8 to the reader/writer 30. Then, the reader/writer 30 transmits this log to the cloud 100. Accordingly, a cause of the malfunction and the like can be quickly clarified.

According to Embodiment 1, the reader/writer 30 collates the model of a write target of the setting information input from the user with the model of the temperature controller 20 transmitted from the RFID module 10. Then, when the models are consistent with each other, the reader/writer 30 wirelessly writes the setting information corresponding to the model into the memory 6 of the RFID module 10.

In this way, by wirelessly writing the setting information, compared to the case of wired writing, operations of unpacking and wired connection are not necessary, and the setting operation can be efficiently performed remotely. Then, in a case in which there is an error in the user's input at the time of setting (for example, there is an error in the model of the input) or a write target is different from the user's intention (for example, the transmission/reception unit of the reader/writer is directed in an unintended direction), a collation defect is acquired, and accordingly, an erroneous setting according to wireless writing can be prevented. Accordingly, an erroneous operation of the temperature controller 20 including the RFID module 10 can be prevented.

In addition, even in a case in which an inappropriate setting is made for a certain reason (in a case in which an erroneous setting file is written, a setting file disappears, or unrelated data is written), such an inappropriate setting can be found through acceptance inspection that does not cause much trouble for a user. Even in a case in which the acceptance test is not performed, the acceptance test is missed due to a human error, or a problem occurs in the setting file after the acceptance test, a setting error is notified of at the time of starting the operation, and an erroneous operation of the temperature controller 20 including the RFID module 10 can be prevented.

Embodiment 2

Figure 12:
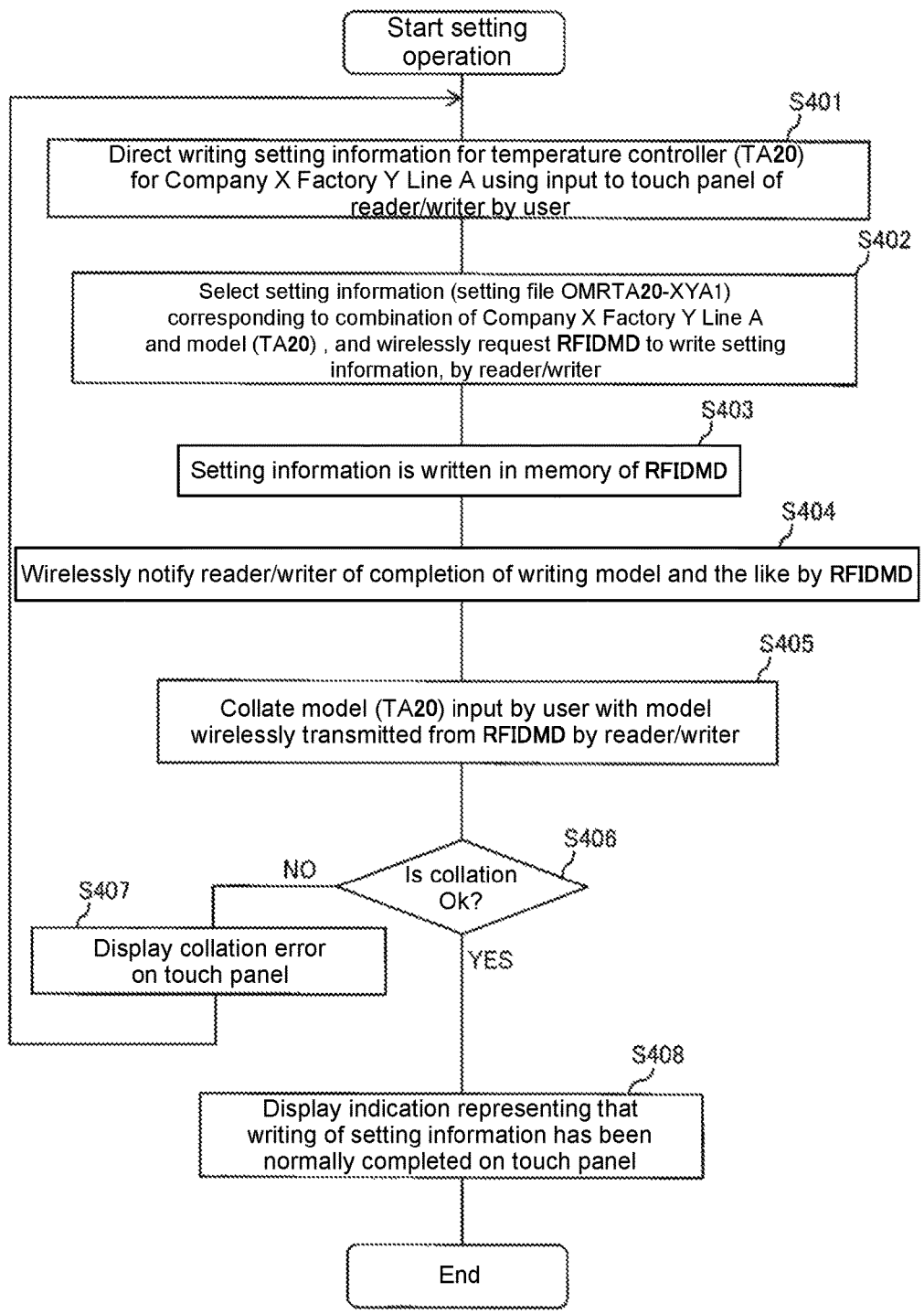
FIG. 12 a flowchart illustrating a setting operation of a wireless communication system according to Embodiment 2.

In this embodiment, as illustrated in FIG. 12, a setting operation of a temperature controller 20 can be performed. First, in Step S401, a user directs writing of setting information in the temperature controller (TA20) for company X factory Y line A by performing an input on a touch panel 32 of a reader/writer 30 (see part (a) of FIG. 4).

In the following Step S402, the reader/writer 30 selects setting information (setting file OMRTA20-XYA1) corresponding to a combination of the company X factory Y line A and the model (TA20) from a table as illustrated in part (b) of FIG. 4 and wirelessly requests an RFID module 10 to write the setting information (Step S402). Accordingly, the setting information is written into the memory 6 of the RFID module 10 (Step S403).

In the following Step S404, the RFID module 10 wirelessly notifies the reader/writer 30 of the completion of writing together with the model. In accordance with this, the reader/writer 30 collates the model (TA20) input by the user in Step S401 with the model that has been wirelessly transmitted from the RFID module 10 in Step S404 (Step S405).

In the case of "no" (inconsistent) in the following Step S406 (is collation OK?), a collation error is displayed on the touch panel 32 (Step S407). On the other hand, in the case of "yes" (consistent) in Step S406 (is collation OK?), an indication representing that the writing of the setting information has been ended normally is displayed on the touch panel 32 (Step S408).

In Embodiment 2 illustrated in FIG. 12, there is an advantage that data exchange between the reader/writer 30 and the RFID module 10 is decreased.

Embodiment 3

Figure 13:
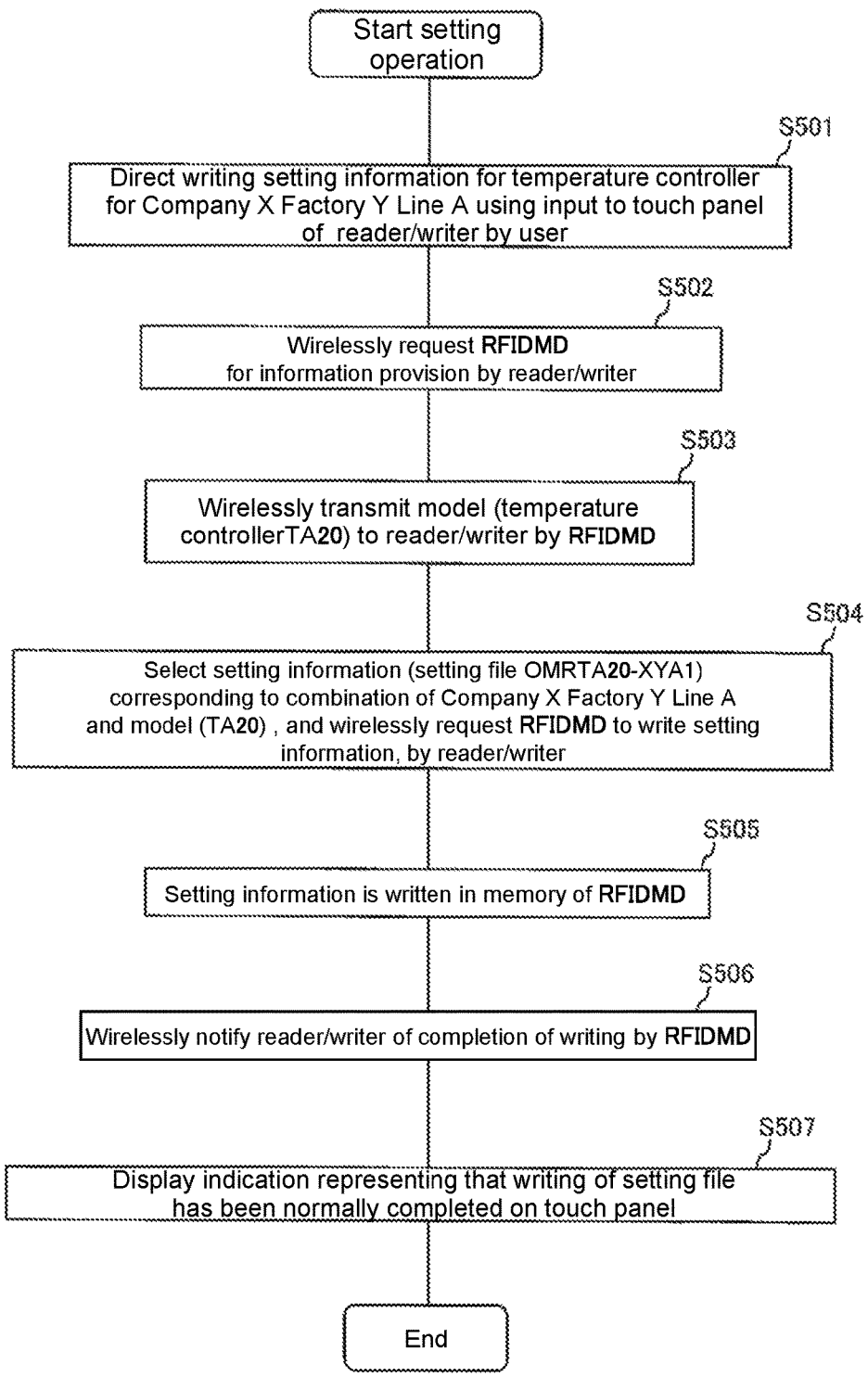
FIG. 13 a flowchart illustrating a setting operation of a wireless communication system according to Embodiment 3.

In this embodiment, as illustrated in FIGS. 13 and 14, a setting operation of a temperature controller 20 can be performed. First, in Step S501, a user directs writing of setting information in a device for company X factory Y line A by performing an input on a touch panel 32 of a reader/writer 30 (see part (a) of FIG. 14).

In the following Step S502, the reader/writer 30 wirelessly requests an RFID module 10 for information provision. In accordance with this, the RFID module 10 wirelessly transmits a model (temperature controller TA20) to the reader/writer 30 (Step S503).

In the following Step S504, the reader/writer 30 selects setting information (setting file OMRTA20-XYA1) corresponding to a combination of the company X factory Y line A and the model (TA20) from a table as illustrated in art (b) of FIG. 14 and wirelessly requests an RFID module 10 to write the setting information (Step S504). Accordingly, the setting information is written in the memory 6 of the RFID module 10 (Step S505).

In the following Step S506, the RFID module 10 wirelessly notifies the reader/writer 30 of the completion of writing, and an indication representing that the writing of the setting file has ended normally is displayed on the touch panel 32 (Step S507).

In Embodiment 3 illustrated in FIG. 13, the user may input only a destination (company X factory Y line A), without selecting the type or the model of the device. Accordingly, there is an advantage that the setting operation can be performed in a speedy manner.

Embodiment 4

Figure 15:
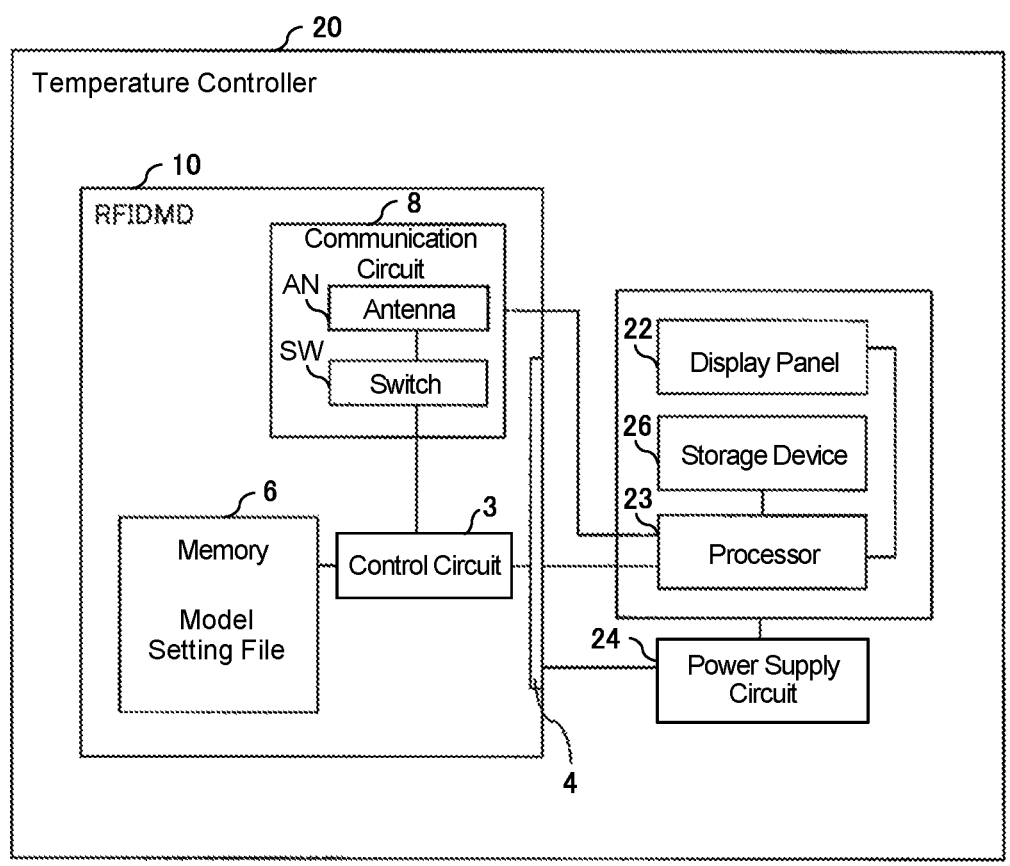
FIG. 15 is a block diagram illustrating a temperature controller according to Embodiment 4.

In this embodiment, a temperature controller 20 can be configured as illustrated in FIG. 15. In other words, a communication circuit 8 of an RFID module 10 is configured to include an antenna AN (for example, an antenna that is separated from a control circuit 3) and a switch SW. Here, the control circuit 3 is connected to the antenna AN through a switch SW, and each of the antenna AN and the switch SW of the communication circuit 8 is connected to a processor 23. The processor 23 controls the switch SW (on or off). In addition, the processor 23 can receive a read request from the reader/writer 30 from the antenna AN regardless of the state (on/off) of the switch SW.

The switch SW is a normally-on type that turns on when the power of the temperature controller 20 is off, and is on at the time of setting (when no power is supplied) described in Embodiments 1 to 3.

Figure 16:
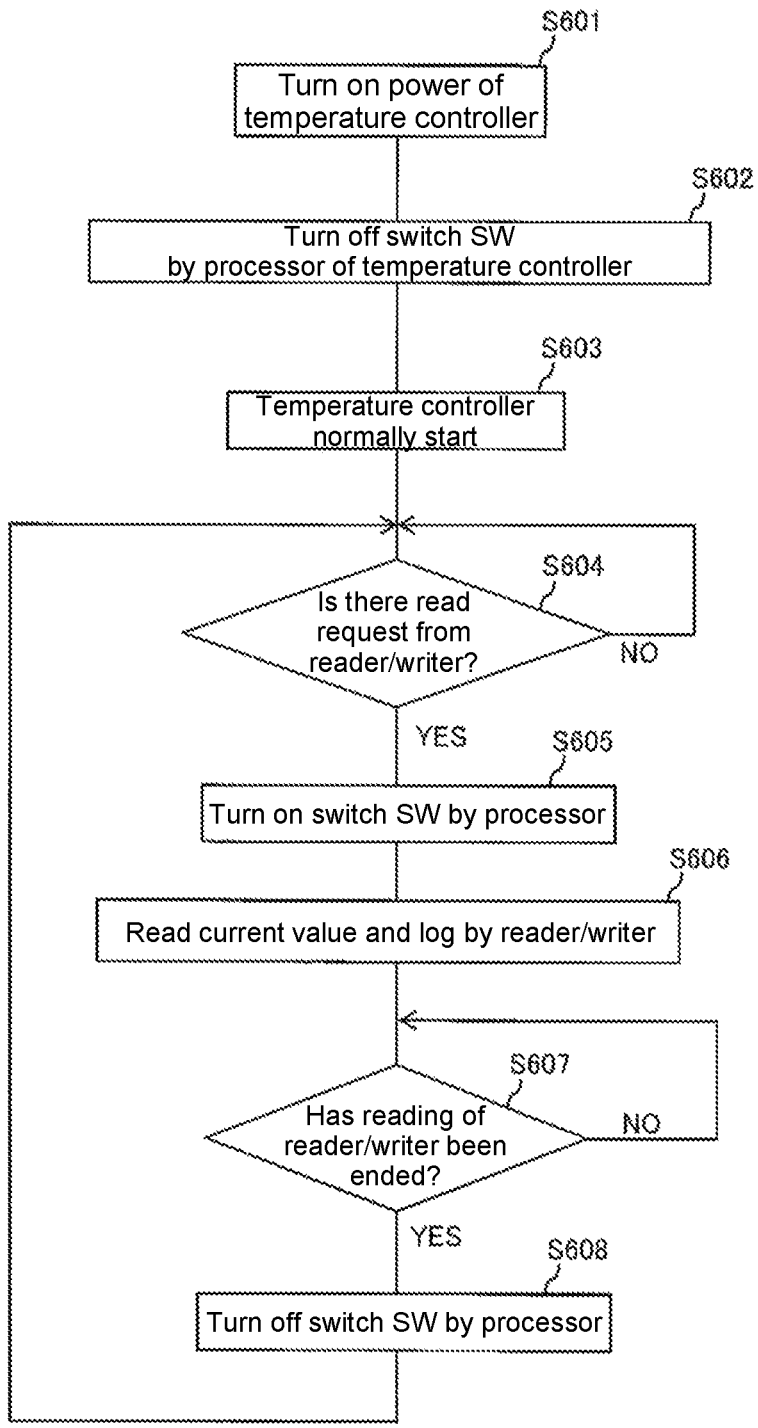
FIG. 16 is a flowchart illustrating the operation of the temperature controller according to Embodiment 4.
Figure 17:
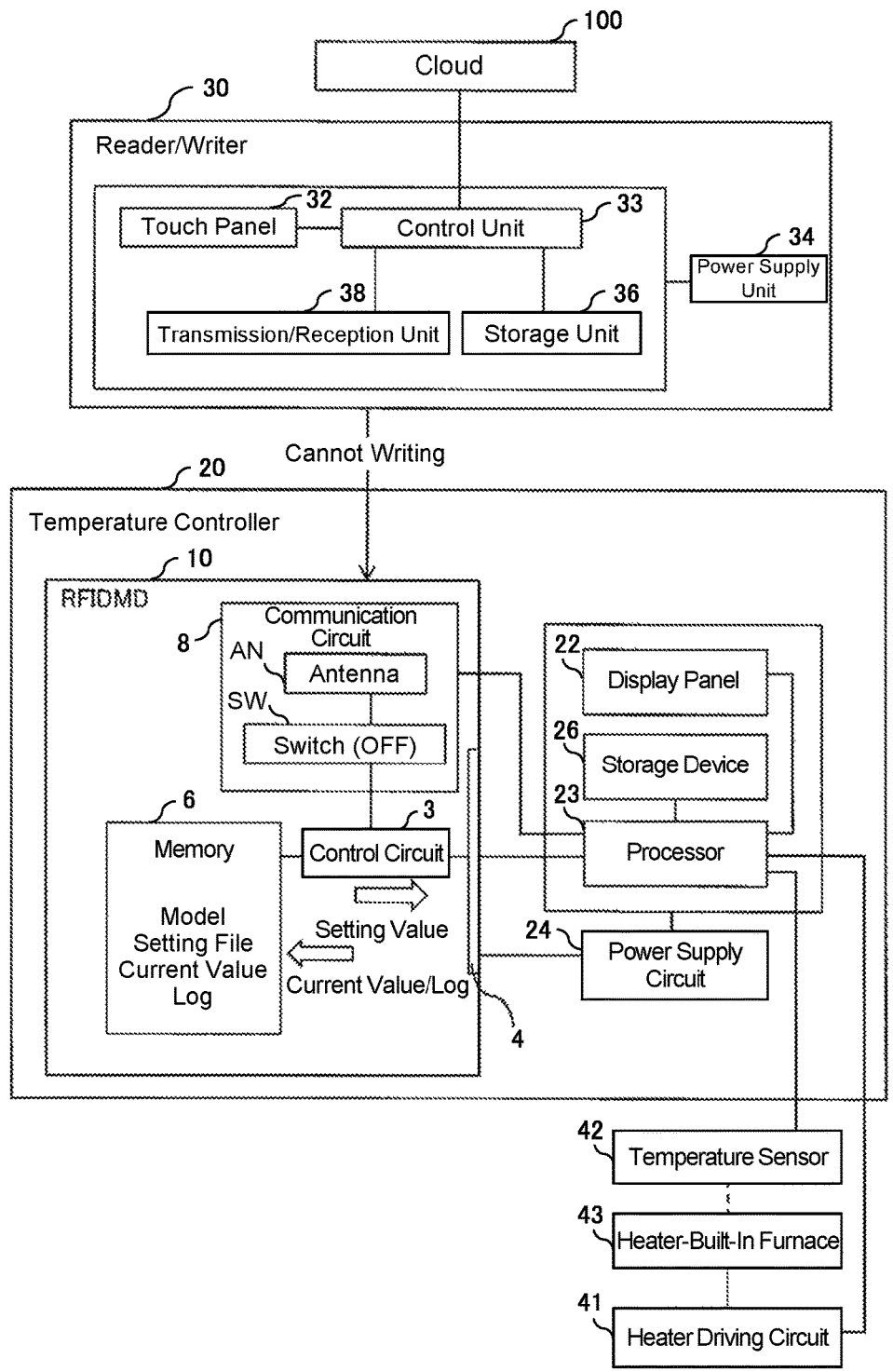
FIG. 17 is a block diagram illustrating an operation-time (switch SW OFF) state of the temperature controller according to Embodiment 4.
Figure 18:
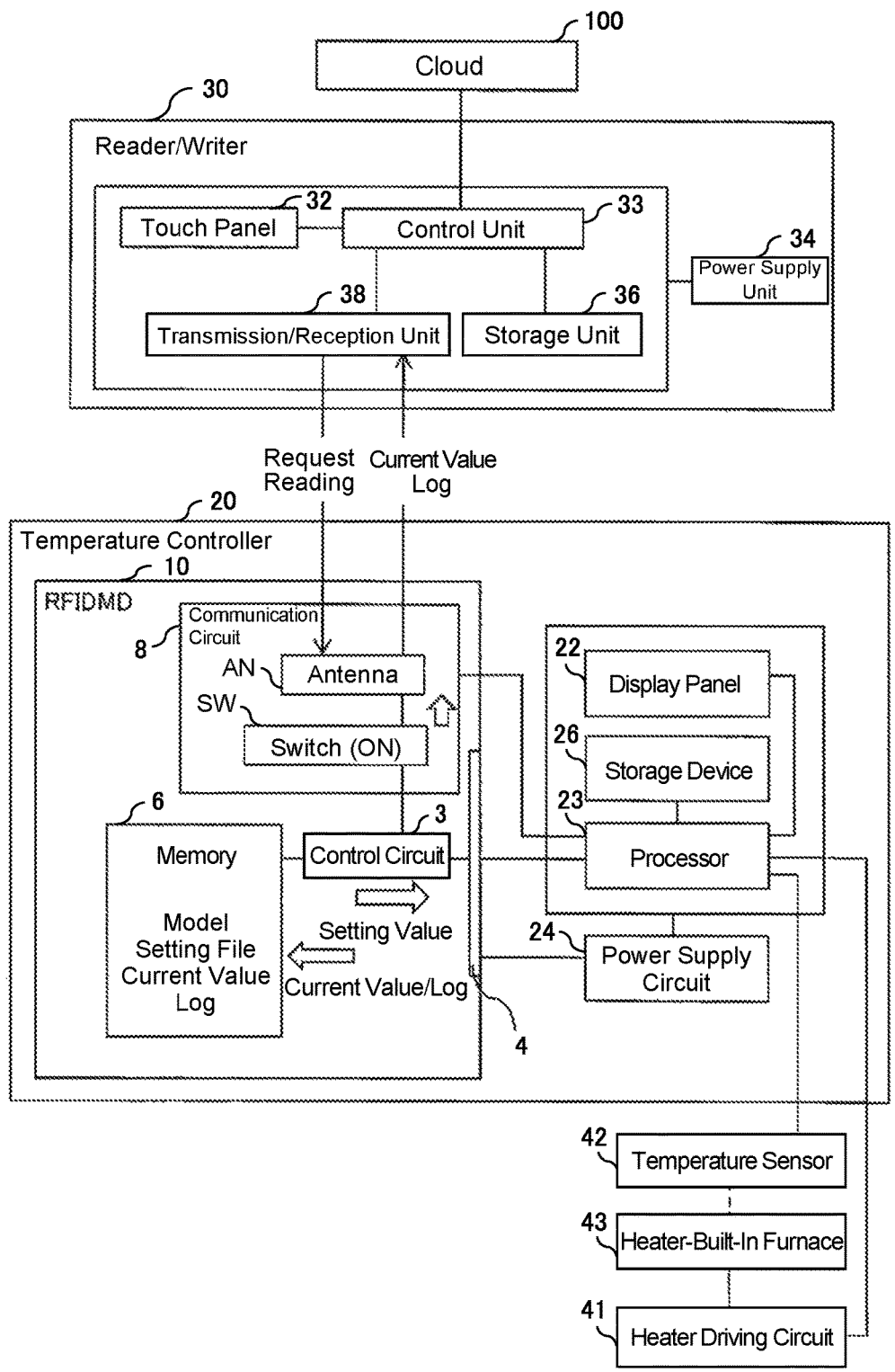
FIG. 18 is a block diagram illustrating an operation-time (switch SW ON) state of the temperature controller according to Embodiment 4.

The temperature controller 20 illustrated in FIG. 15, for example, operates as illustrated in FIGS. 16 to 18. In other words, in step 601, when the power of the temperature controller turns on, a processor 23 of the temperature controller 20 turns the switch SW off (Step S602). Accordingly, the writing of data in the memory 6 using the reader/writer 30 is prohibited.

In Step S603, when operations of the temperature controller 20 starts normally, the processor 23 controls a heater driving circuit 41 using various setting values read from the setting file stored in the memory 6 of the RFID module 10 and writes a current value (temperature) and a log into the memory 6 of RFID module 10 (see FIG. 17).

Thereafter, the process proceeds to Step S604 (is there a read request from the reader/writer 30?). In the case of "yes" in Step S604 (a read signal from the reader/writer 30 is detected by the processor 23), the processor 23 turns the switch SW on (Step S605), and the control circuit 3 corresponding to the read request transmits the current value or the log stored in the memory 6 to the reader/writer 30 (see FIG. 18). Accordingly, the current value or the log is read by the reader/writer 30 (Step S606). Then, when the reading process of the reader/writer 30 ends (Yes in Step S607), the processor 23 turns the switch SW off (Step S608), and the process returns to Step S604.

In Embodiment 4, during the operation of the temperature controller 20, the switch SW turns off in a period other than a read period of the reader/writer 30, and writing of data in the memory 6 using the reader/writer 30 can be prevented. In addition, in the read period for reading data from the memory 6 using the reader/writer 30, the RFID module 10 cannot write data into the memory 6. Accordingly, during the operation of the temperature controller 20, the writing of data in the memory 6 using the RFID module 10 cannot be substantially performed, and a situation in which the setting file stored in the memory 6 is erroneously rewritten during the operation of the temperature controller 20, and the temperature controller 20 malfunctions can be avoided. In addition, since the switch SW turns on when the power of the temperature controller 20 is off, the writing of the setting information in the memory 6 described in Embodiments 1 to 3 can be performed.

Figure 19:
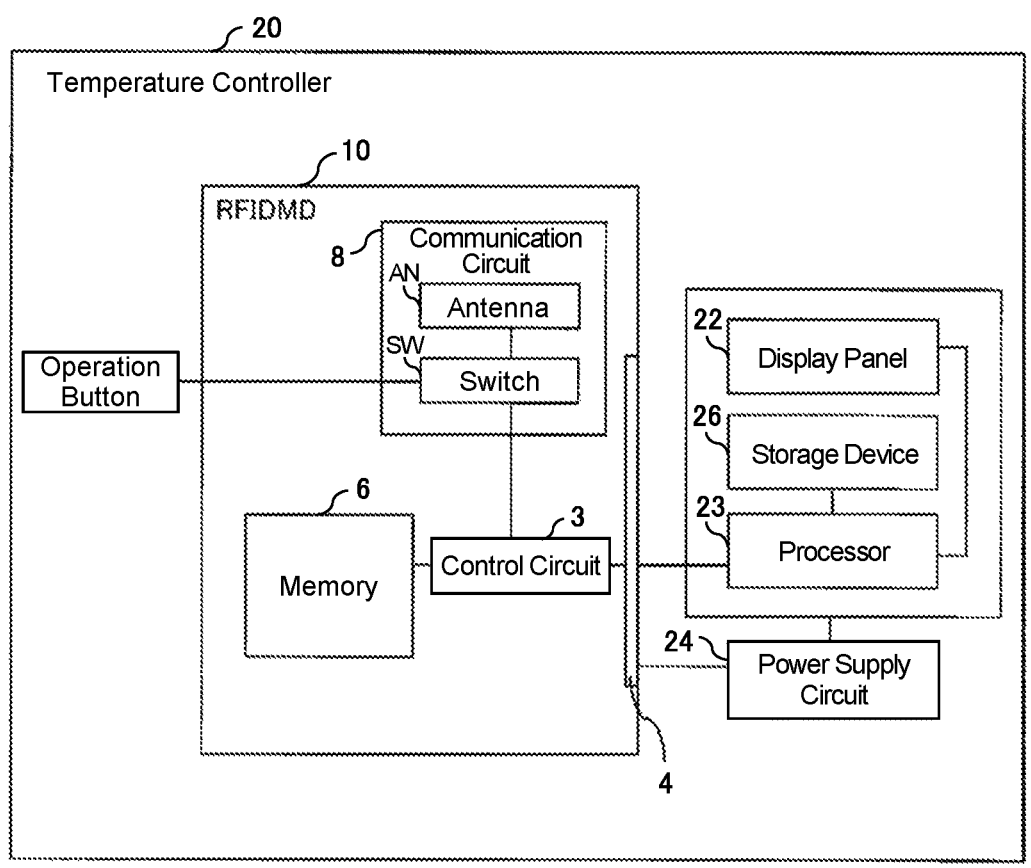
FIG. 19 is a block diagram illustrating another configuration of the temperature controller according to Embodiment 4.

The switch SW according to Embodiment 4 is not limited to the configuration illustrated in FIG. 15 and may be configured as illustrated in FIG. 19. That is, a user can directly turn on or off using an operation button disposed on the periphery of the display panel 22 (a casing face of the temperature controller 20) as illustrated in FIG. 19. In such a case, when necessary (for example, in a case in which writing of information into a nearby device is performed using the reader/writer), by turning the switch SW off using the operation button of the temperature controller 20, a situation in which a writing operation for another device is erroneously performed for the temperature controller 20 can be avoided.

Embodiment 5

Figure 20:
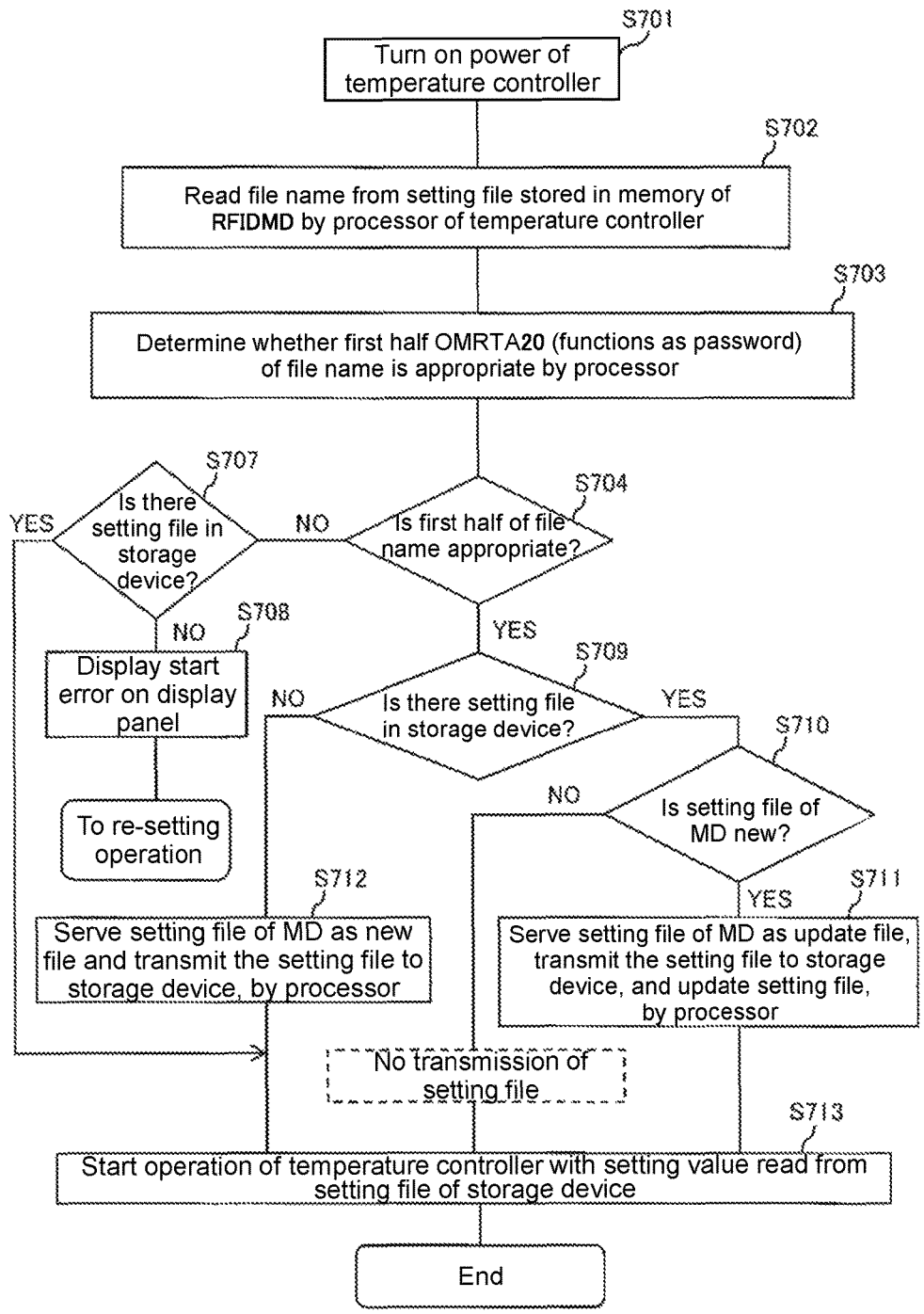
FIG. 20 is a flowchart illustrating a starting process of the temperature controller according to Embodiment 5.
Figure 21:
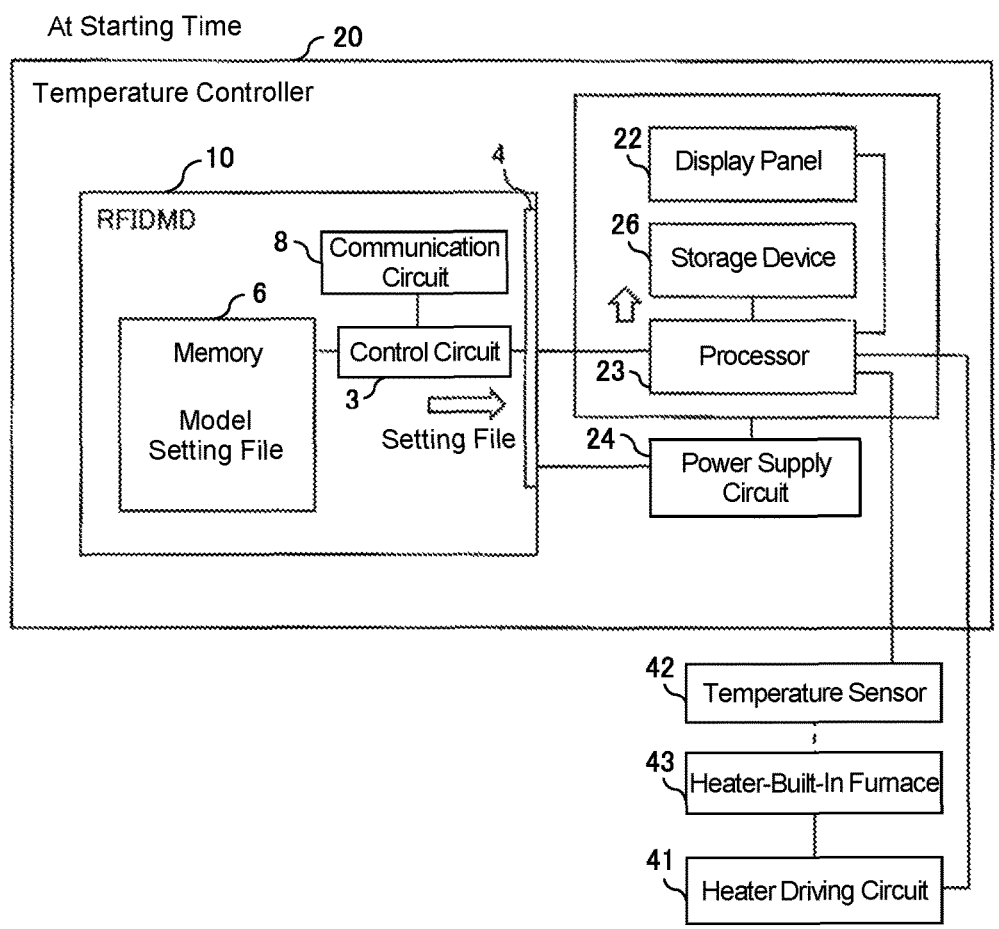
FIG. 21 is a block diagram illustrating a start-time state of the temperature controller according to Embodiment 5.
Figure 22:
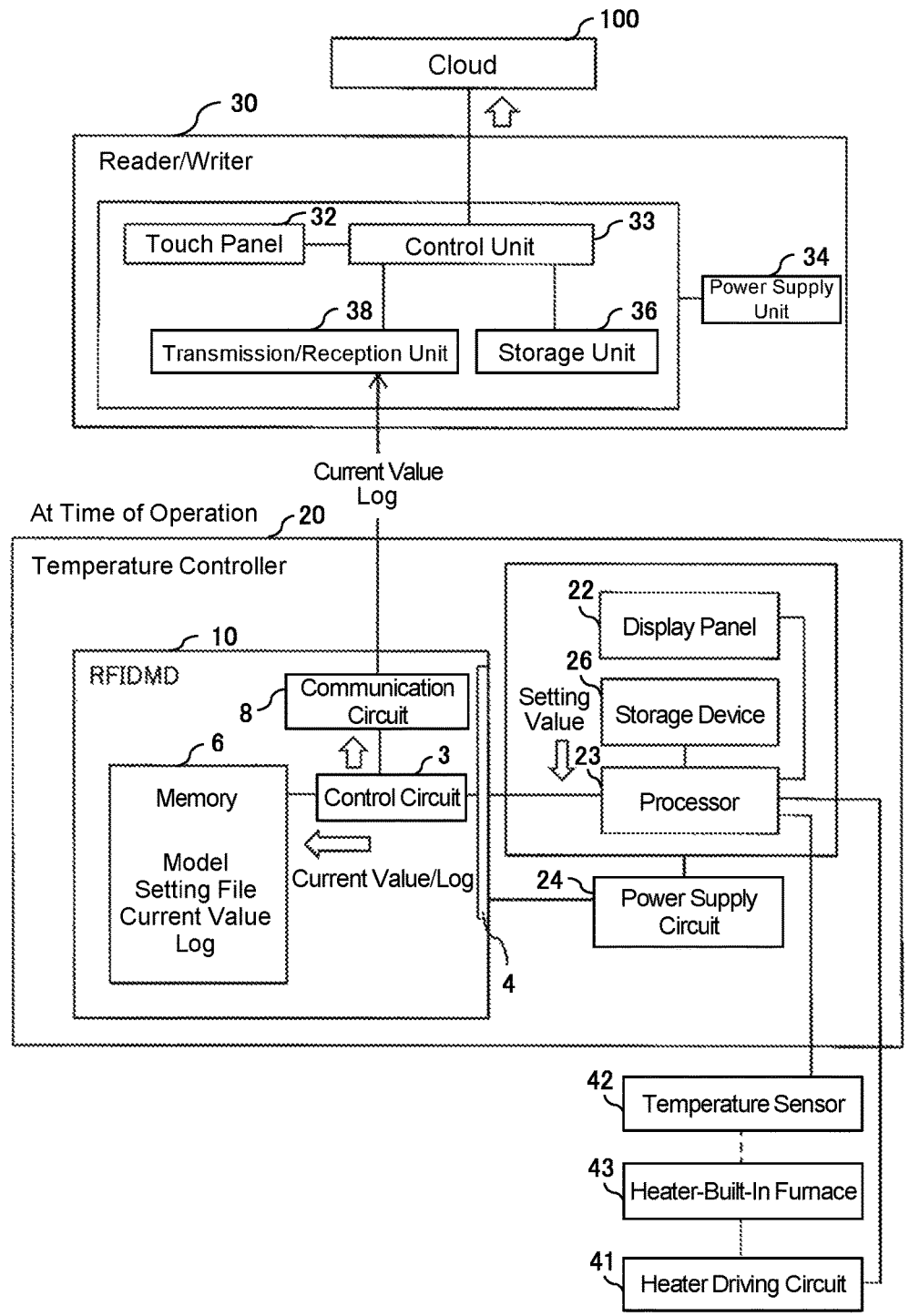
FIG. 22 is a block diagram illustrating an operation-time state of the temperature controller according to Embodiment 5.

In this embodiment, a temperature controller 20 can be configured as illustrated in FIGS. 20 to 22.

As illustrated in FIG. 20, when the power of the temperature controller 20 becomes On in Step S701, a processor 23 of the temperature controller 20 reads a file name from a setting file stored in the memory 6 of the RFID module 10 (S702) and determines whether a first half "OMRTA20" of a file name, which is identification information, functioning as a password is appropriate (Step S703).

In the case of "Yes" (appropriate) in the following Step S704 (is a first half of the file name appropriate?), the process proceeds to Step S709 (is there a setting file in a storage device 26 of the temperature controller 20?). In the case of "No" in Step S709, as illustrated in FIGS. 20 and 21, the processor 23 serves the setting file stored in the memory 6 of the RFID module 10 as a new file and transmits the same to the storage device 26 that cannot be wirelessly accessed (Step S712) and reads required setting values from the setting file stored in the storage device 26 and starts the operation of the temperature controller (Step S713).

In the case of "Yes" in Step S709, the processor 23 determines whether or not the setting file of the RFID module 10 is a new file on the basis of the version information (an end part of the file name) (Step S710). In the case of "Yes" (new) in Step S710, as illustrated in FIGS. 20 and 21, the processor 23 serves the setting file of the RFID module 10 as an update file and transmits the same to the storage device 26 to replace the old setting file (Step S711), reads required setting values from the setting file stored in the storage device 26, and starts the operation of the temperature controller 20 (Step S713).

In the case of "No" (not a new setting file) in Step S710, the processor 23 does not transmit the setting file, reads required setting values from the setting file (previously transmitted) stored in the storage device 26, and starts the operation of the temperature controller 20 (Step S713).

In addition, in the case of "No" (inappropriate) in Step S704 (is the first half of the file name appropriate?), the process proceeds to Step S707 (is there a setting file in the storage device 26?), and in the case of "Yes" (there is a setting file) in Step S707, required setting values are read from the setting file (previously transmitted) stored in the storage device 26, and the operation of the temperature controller 20 is started (Step S713). On the other hand, in the case of "No" (there is no setting file) in Step S707, a start error is displayed on the display panel 22 (Step S708), and the process proceeds to the re-setting operation (see FIG. 5).

When the temperature controller 20 is normally started to operate, as illustrated in FIG. 22, the processor 23 reads required setting values from the setting file stored in the storage device 26 of the temperature controller 20 and controls the heater driving circuit 41 and writes a current value (temperature) and a log into the memory 6 of the RFID module 10 through the control circuit 3.

Then, in a case in which a read request for the current value or the log (operation information) is received from the reader/writer 30, the control circuit 3 transmits the current value (temperature) or the log of the memory 6 from the communication circuit 8 to the reader/writer 30. The reader/writer 30 may transmit the current value or the log transmitted from the temperature controller 20 to a network (a cloud 100 or the like).

In the temperature controller 20 according to Embodiment 5, at the time of starting, the processor 23 transmits the setting file stored in the memory 6 to the storage device 26 that cannot be wirelessly accessed and performs a starting process. During operating, required setting values are read from the setting file stored in the storage device 26. Accordingly, even when the setting file stored in the memory 6 is erroneously rewritten during operation of the temperature controller 20, a malfunction of the temperature controller 20 can be prevented.

[Summary]

The model (model information) described in each embodiment described above is information used for specifying the kind of electronic apparatus and may be either the model or a serial number or the like that can specify the model. In addition, the specification information may be information of a destination or information of a sub model subdividing the model. Furthermore, the identification information (OMRTA20 in the example described above) is information used for identifying the setting information (in the example described above, it represents a setting file for the temperature controller TA20 manufactured by OMR Corp.) and may function as a password.

The present invention is not limited to the embodiments described above, and an embodiment acquired by appropriately combining technical means disclosed in different embodiments also belongs to the technical scope of the present invention. In addition, by combining technical means disclosed in the embodiments, a new technical feature may be formed.

There is provided a wireless communication system including: an electronic apparatus including a wireless communication module and a processing unit connected to the wireless communication module through a wired communication port, the wireless communication module includes the wired communication port and a memory; and a reader/writer capable of wirelessly communicating with the wireless communication module, wherein a model of the electronic apparatus is stored in the memory of the wireless communication module, and the reader/writer collates a model that is a write target of setting information input from a user with the model of the electronic apparatus transmitted from the wireless communication module and, in a case in which both the models are consistent with each other, wirelessly writes setting information corresponding to the model into the memory of the wireless communication module. In other words, in the case of a collation defect in which both models are not consistent with each other, wireless writing of setting information using the reader/writer is not performed.

In this way, by wirelessly writing the setting information, compared to the case of wired writing, operations of unpacking and a wired connection are not necessary, and the setting operation can be efficiently performed remotely.

Then, in a case in which there is an error in the user's input (for example, there is an error in the model of the input) or a write target is different from user's intention (for example, the reader/writer is directed toward an unintended direction), a collation defect is acquired, and accordingly, an erroneous setting according to wireless writing can be prevented. Accordingly, an erroneous operation of the electronic apparatus including the wireless communication module can be prevented.

There is provided a wireless communication system including: an electronic apparatus including a wireless communication module and a processing unit connected to the wireless communication module through a wired communication port, the wireless communication module includes the wired communication port and a memory; and a reader/writer capable of wirelessly communicating with the wireless communication module, wherein a model of the electronic apparatus is stored in the memory of the wireless communication module, and, when a model of a writing target is input from a user, the reader/writer wirelessly writes setting information corresponding to the model of the writing target into the memory of the wireless communication module and then collates the model of the electronic apparatus wirelessly transmitted from the wireless communication module in accordance with the writing with the model of the writing target input from the user and notifies normal end of the writing in a case in which both the models are consistent with each other.

According to this configuration, in a case in which there is an error in the user's input (for example, there is an error in the model of the input) or a write target is different from user's intention (for example, the reader/writer is directed toward an unintended direction), a collation defect is acquired, and accordingly, an erroneous setting according to wireless writing can be prevented. Accordingly, an erroneous operation of the electronic apparatus including the wireless communication module can be prevented.

There is provided a wireless communication system including: an electronic apparatus including a wireless communication module and a processing unit connected to the wireless communication module through a wired communication port, the wireless communication module includes the wired communication port and a memory; and a reader/writer capable of wirelessly communicating with the wireless communication module, wherein a model of the electronic apparatus is stored in the memory of the wireless communication module, and the reader/writer selects setting information corresponding to a combination of specification information input from a user and the model of the electronic apparatus wirelessly transmitted from the wireless communication module and wirelessly writes the selected setting information into the memory of the wireless communication module.

According to this configuration, since a user may not input the type or the model of electronic apparatus, an input error decreases, and a malfunction of the electronic apparatus including the wireless communication module can be decreased. In addition, a speedy setting process can be performed.

In the wireless communication system, the reader/writer may be configured to select setting information corresponding to a combination of specification information input from a user and the model of the electronic apparatus wirelessly transmitted from the wireless communication module and write the selected setting information into the memory of the wireless communication module.

In the wireless communication system, a configuration may be employed in which identification information is included in the setting information, and the processing unit of the electronic apparatus performs a starting process of the electronic apparatus using the setting information only in a case in which the identification information is appropriate.

In the wireless communication system, a configuration may be employed in which the electronic apparatus includes a storage device that cannot be wirelessly accessed, and the processing unit determines whether the identification information is appropriate or not by referring the identification information to predetermined data stored in the storage device.

In the wireless communication system, information of the model and the specification information may be configured to be included in the setting information.

In the wireless communication system, the wireless communication module of the electronic apparatus is configured to wirelessly transmit an indication representing no writing to the reader/writer in a case in which the setting information is not written, and wirelessly transmit the information of the model and the specification information included in the setting information to the reader/writer in a case in which the setting information is written, in accordance with a wireless request from the reader/writer.

In the wireless communication system, a configuration may be employed in which version information is further included in the setting information, and, in a case in which the setting information is written, the wireless communication module of the electronic apparatus wirelessly transmits also the version information included in the setting information to the reader/writer.

In the wireless communication system, the reader/writer is configured to refer the information of the model, the specification information, and the version information to acceptance inspection information and notify a result of the referring.

In the wireless communication system, the processing unit is configured to write operation information of the electronic apparatus into the memory of the wireless communication module through the wired communication port when the electronic apparatus is in operation.

In the wireless communication system, the reader/writer is configured to wirelessly read the operation information from the memory of the wireless communication module.

In the wireless communication system, a configuration may be employed in which the reader/writer can be connected to a network and transmits the operation information wirelessly read from the memory of the wireless communication module to the network.

In the wireless communication system, the wireless communication module is configured as being an RFID module.

There is provided a reader/writer that can wirelessly communicate with an electronic apparatus, the electronic apparatus includes a wireless communication module and a processing unit connected to the wireless communication module through a wired communication port, the wireless communication module includes the wired communication port and a memory, wherein the reader/writer collates a model of a writing target of setting information input from a user with a model of the electronic apparatus wirelessly transmitted from the wireless communication module of the electronic apparatus, and wirelessly writes setting information corresponding to the model into the memory of the wireless communication module in a case in which both the models are consistent with each other.

There is provided a reader/writer that can wirelessly communicate with an electronic apparatus, the electronic apparatus includes a wireless communication module and a processing unit connected to the wireless communication module through a wired communication port, the wireless communication module includes the wired communication port and a memory, wherein, when a model of a writing target is input from a user, the reader/writer wirelessly writes setting information corresponding to the model of the writing target into the memory of the wireless communication module and then collates the model of the electronic apparatus wirelessly transmitted from the wireless communication module in accordance with the writing with the model of the writing target input from the user, and notifies normal end of the writing in a case in which both the models are consistent with each other.

There is provided a reader/writer that can wirelessly communicate with an electronic apparatus, the electronic apparatus includes a wireless communication module and a processing unit connected to the wireless communication module through a wired communication port, the wireless communication module includes the wired communication port and a memory, wherein the reader/writer wirelessly writes setting information corresponding to a combination of specification information input from a user and the model of the electronic apparatus wirelessly transmitted from the wireless communication module into the memory of the wireless communication module.

There is provided an electronic apparatus including a wireless communication module and a processing unit connected to the wireless communication module through a wired communication port, the wireless communication module includes the wired communication port and a memory, wherein setting information is written into the memory of the wireless communication module, and the processing unit determines whether identification information included in the setting information is appropriate or not, and performs a starting process using the setting information only in a case in which the identification information is appropriate.

In the electronic apparatus, a configuration may be employed in which the electronic apparatus includes a storage device that cannot be wirelessly accessed, and the processing unit determines whether the identification information is appropriate or not by referring the identification information to predetermined data stored in the storage device.

What is claimed is:

1. A wireless communication system comprising:
an electronic apparatus including a wireless communication module and a processing unit connected to the wireless communication module through a wired communication port, the wireless communication module comprises the wired communication port and a memory; and
a reader/writer capable of wirelessly communicating with the wireless communication module,
wherein a model of the electronic apparatus is stored in the memory of the wireless communication module,
wherein the reader/writer wirelessly transmits an information provision request to the wireless communication module, and the wireless communication module wirelessly transmits the model of the electronic apparatus to the reader/writer in response to the information provision request, and
wherein the reader/writer collates a model of a write target of setting information input by a user with the model of the electronic apparatus transmitted from the wireless communication module to obtain a collation result and, in response to the collation result that the models are consistent with each other, wirelessly writes setting information corresponding to the model into the memory of the wireless communication module.

2. A wireless communication system comprising:
an electronic apparatus including a wireless communication module and a processing unit connected to the wireless communication module through a wired communication port, the wireless communication module comprises the wired communication port and a memory; and
a reader/writer capable of wirelessly communicating with the wireless communication module,
wherein a model of the electronic apparatus is stored in the memory of the wireless communication module, and
wherein, when a model of a writing target is input by a user, the reader/writer wirelessly writes setting information corresponding to the model of the writing target into the memory of the wireless communication module,
wherein the wireless communication module notifies the reader/writer the completion of the writing together with the model of the electronic apparatus stored in the memory of the wireless communication module, and the reader/writer then collates the model of the electronic apparatus wirelessly transmitted from the wireless communication module in accordance with the writing with the model of the writing target input by the user to obtain a collation result and notifies that the writing has ended normally in response to the collation result that the models are consistent with each other.

3. A wireless communication system comprising:
an electronic apparatus including a wireless communication module and a processing unit connected to the wireless communication module through a wired communication port, the wireless communication module comprises the wired communication port and a memory; and
a reader/writer capable of wirelessly communicating with the wireless communication module,
wherein a model of the electronic apparatus is stored in the memory of the wireless communication module,
wherein the reader/writer wirelessly transmits an information provision request to the wireless communication module, and the wireless communication module wirelessly transmits the model of the electronic apparatus to the reader/writer in response to the information provision request, and wherein the reader/writer selects setting information corresponding to a combination of specification information input by a user and the model of the electronic apparatus wirelessly transmitted from the wireless communication module and wirelessly writes the selected setting information into the memory of the wireless communication module.

4. The wireless communication system according to claim 1, wherein the reader/writer selects setting information corresponding to a combination of specification information input by the user and the model of the electronic apparatus wirelessly transmitted from the wireless communication module and writes the selected setting information into the memory of the wireless communication module.

5. The wireless communication system according to claim 1,
wherein the setting information comprises identification information, and
wherein the processing unit of the electronic apparatus performs a starting process of the electronic apparatus using the setting information only in a case in which the identification information is appropriate.

6. The wireless communication system according to claim 5,
wherein the electronic apparatus comprises a storage device not capable of being wirelessly accessed, and
wherein the processing unit determines whether the identification information is appropriate or not by referring the identification information to predetermined data stored in the storage device.

7. The wireless communication system according to claim 4, wherein the setting information comprises information of the model and the specification information.

8. The wireless communication system according to claim 7, wherein the wireless communication module of the electronic apparatus wirelessly transmits to the reader/writer an indication representing the setting information is not written in a case in which the setting information is not written and wirelessly transmits to the reader/writer the information of the model and the specification information comprised in the setting information in a case in which the setting information is written, in accordance with a wireless request from the reader/writer.

9. The wireless communication system according to claim 8,
wherein the setting information further comprises version information, and
wherein, in a case in which the setting information is written, the wireless communication module of the electronic apparatus also wirelessly transmits the version information comprised in the setting information to the reader/writer.

10. The wireless communication system according to claim 9, wherein the reader/writer refers the information of the model, the specification information, and the version information to acceptance inspection information and notifies of a result of the referring.

11. The wireless communication system according to claim 1, wherein the processing unit writes operation information of the electronic apparatus into the memory of the wireless communication module through the wired communication port when the electronic apparatus is in operation.

12. The wireless communication system according to claim 11, wherein the reader/writer wirelessly reads the operation information from the memory of the wireless communication module.

13. The wireless communication system according to claim 12, wherein the reader/writer is capable of being connected to a network and transmits the operation information wirelessly read from the memory of the wireless communication module to the network.

14. The wireless communication system according to claim 1, wherein the wireless communication module is an RFID module.

15. A reader/writer capable of wirelessly communicating with an electronic apparatus, the electronic apparatus comprises a wireless communication module and a processing unit connected to the wireless communication module through a wired communication port, the wireless communication module comprises the wired communication port and a memory,
wherein the reader/writer wirelessly transmits an information provision request to the wireless communication module, and wirelessly receives a model of the electronic apparatus from the wireless communication module, and
wherein the reader/writer collates a model of a writing target of setting information input by a user with the model of the electronic apparatus wirelessly transmitted from the wireless communication module of the electronic apparatus to obtain a collation result, and wirelessly writes setting information corresponding to the model into the memory of the wireless communication module in response to the collation result that the models are consistent with each other.

16. A reader/writer capable of wirelessly communicating with an electronic apparatus, the electronic apparatus comprises a wireless communication module and a processing unit connected to the wireless communication module through a wired communication port, the wireless communication module comprises the wired communication port and a memory,
wherein, when a model of a writing target is input by a user, the reader/writer wirelessly writes setting information corresponding to the model of the writing target into the memory of the wireless communication module,
wherein the reader/writer receives a notification of the completion of the writing together with a model of the electronic apparatus stored in the memory of the wireless communication module from the wireless communication module, and then collates the model of the electronic apparatus wirelessly transmitted from the wireless communication module in accordance with the writing with the model of the writing target input by the user to obtain a collation result and notifies that the writing has ended normally in response to the collation result that the models are consistent with each other.

17. A reader/writer capable of wirelessly communicating with an electronic apparatus, the electronic apparatus comprises a wireless communication module and a processing unit connected to the wireless communication module through a wired communication port, the wireless communication module comprises the wired communication port and a memory,
wherein the reader/writer wirelessly transmits an information provision request to the wireless communication module, and wirelessly receives a model of the electronic apparatus from the wireless communication module, and
wherein the reader/writer wirelessly selects setting information corresponding to a combination of specification information input by a user and the model of the electronic apparatus wirelessly transmitted from the wireless communication module and wirelessly writes the selected setting information into the memory of the wireless communication module.

18. An electronic apparatus comprising a wireless communication module and a processing unit connected to the wireless communication module through a wired communication port, the wireless communication module comprises the wired communication port and a memory, wherein setting information is written in the memory of the wireless communication module, and wherein the processing unit determines whether identification information comprised in the setting information is appropriator not and performs a starting process using the setting information only in a case in which the identification information is appropriate.

19. The electronic apparatus according to claim 18, wherein the electronic apparatus comprises a storage device not capable of being wirelessly accessed, and wherein the processing unit determines whether identification information comprised in the setting information is appropriate or not by referring the identification information to predetermined data stored in the storage device.

20. The wireless communication system according to claim 2, wherein the reader/writer selects setting information corresponding to a combination of specification information input by the user and the model of the electronic apparatus wirelessly transmitted from the wireless communication module and writes the selected setting information into the memory of the wireless communication module.

* * * * *